US008260268B2

(12) United States Patent
Cho et al.

(10) Patent No.: US 8,260,268 B2
(45) Date of Patent: Sep. 4, 2012

(54) METHOD FOR TRANSMITTING AND RECEIVING DATA IN MOBILE TERMINAL AND MOBILE TERMINAL USING THE SAME

(75) Inventors: Hye Youn Cho, Seoul (KR); Byung Sang Yeo, Seoul (KR); Seong Yoon Cho, Seoul (KR); Yee Rang Yun, Seoul (KR); Yoo Mee Song, Seoul (KR); Dong Seok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 12/833,626

(22) Filed: Jul. 9, 2010

(65) Prior Publication Data

US 2011/0009101 A1 Jan. 13, 2011

(30) Foreign Application Priority Data

Jul. 10, 2009 (KR) .................. 10-2009-0062930
Jul. 10, 2009 (KR) .................. 10-2009-0062931

(51) Int. Cl.
*H04M 3/42* (2006.01)
*H04W 4/00* (2009.01)
*G06F 15/16* (2006.01)
(52) U.S. Cl. ............... 455/414.1; 455/466; 709/204; 709/206
(58) Field of Classification Search ............... 455/414.1, 455/466; 709/204, 206
See application file for complete search history.

(56) References Cited

U.S. PATENT DOCUMENTS

2004/0205126 A1* 10/2004 Ben-Yoseph ............ 709/204
2007/0067392 A1* 3/2007 Torres et al. ............ 709/206
\* cited by examiner

*Primary Examiner* — Ariel Balaoing
(74) *Attorney, Agent, or Firm* — Birch, Stewart, Kolasch & Birch, LLP

(57) ABSTRACT

A method of controlling a mobile terminal, the method including displaying, via a display on the mobile terminal, a list of contacts included on the mobile terminal, selecting, via an input unit on the mobile terminal, a first contact included in the list of contacts, accessing, via a wireless communication unit, a web site corresponding to the first contact, displaying, on the display, a list of contacts of the first contact included on the web site corresponding to the first contact without displaying personal contact information for the list of contacts of the first contact, selecting, via the input unit, a second contact from the list of contacts of the first contact, displaying, via the display, a plurality of options for communicating with the second contact without displaying personal contact information of the second contact that is used for communicating with the second contact, selecting, via the input unit, one of the plurality of options for communicating with the second contact, and communicating, via the wireless communication unit, with the second contact via the selected communication option without displaying the personal contact information that is used for communicating with the second contact.

20 Claims, 22 Drawing Sheets

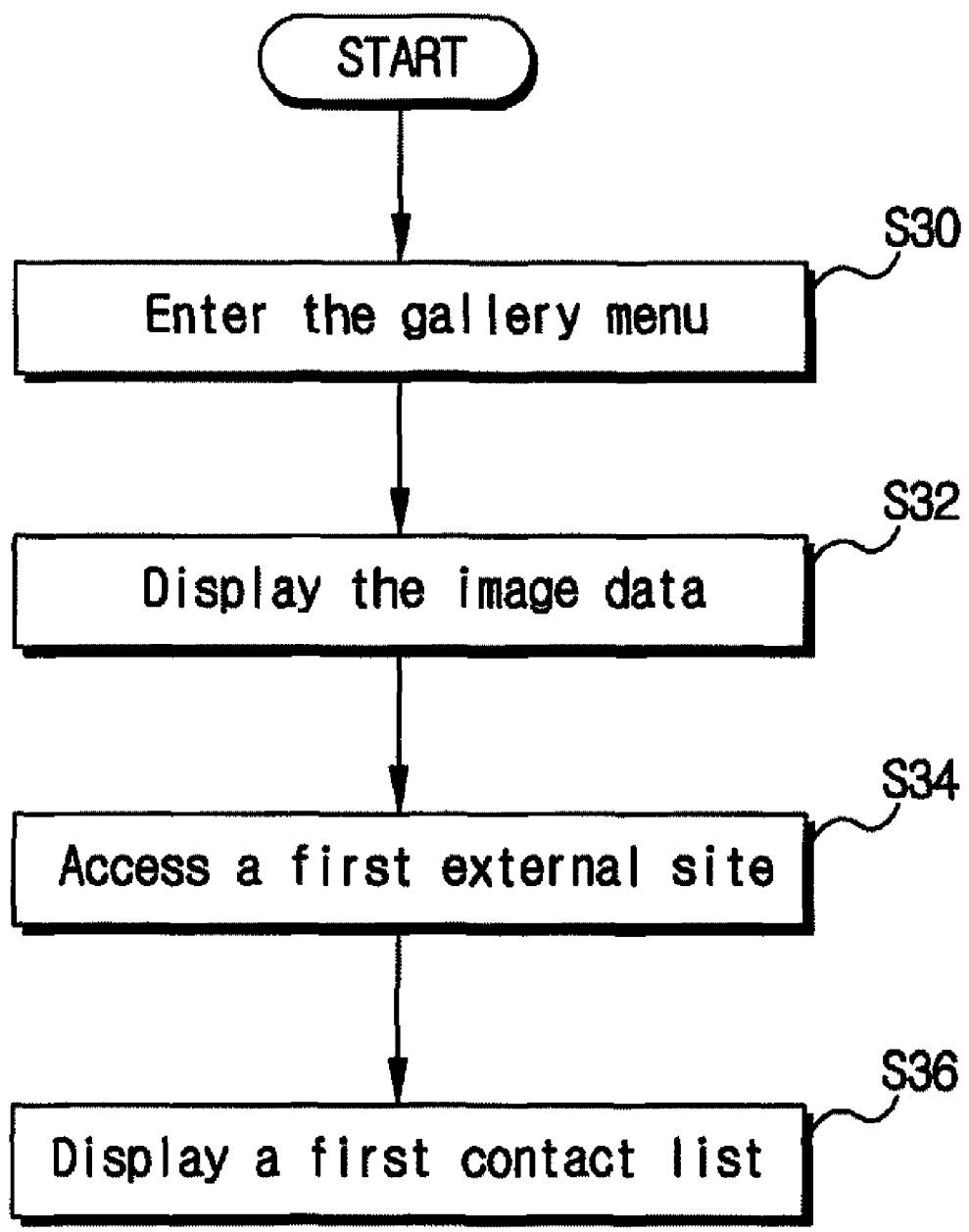

METHOD FOR TRANSMITTING AND RECEIVING DATA IN MOBILE TERMINAL AND MOBILE TERMINAL USING THE SAME

CROSS REFERENCE TO A RELATED APPLICATION

The present application claims the benefit of Korean Patent Application Nos. 10-2009-0062930 and 10-2009-0062931, filed on Jul. 10, 2009, which are hereby incorporated by reference in their entireties.

BACKGROUND OF THE INVENTION

1. Field of the Invention

The present invention to a mobile terminal and corresponding method for protecting the personal privacies of users.

2. Discussion of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

However, as the terminals can now access different websites on the Internet, the privacy of users is becoming less and less, which is problematic for many users.

SUMMARY OF THE INVENTION

Accordingly, one object of the present invention is to address the above-noted and other problems.

Another object of the present invention is to provide a novel mobile terminal and corresponding method that protects personal information of users.

To achieve these and other advantages and in accordance with the purpose of the present invention, as embodied and broadly described herein, the present invention provides in one aspect a method of controlling a mobile terminal, and which includes displaying, via a display on the mobile terminal, a list of contacts included on the mobile terminal, selecting, via an input unit on the mobile terminal, a first contact included in the list of contacts, accessing, via a wireless communication unit, a web site corresponding to the first contact, displaying, on the display, a list of contacts of the first contact included on the web site corresponding to the first contact without displaying personal contact information for the list of contacts of the first contact, selecting, via the input unit, a second contact from the list of contacts of the first contact, displaying, via the display, a plurality of options for communicating with the second contact without displaying personal contact information of the second contact that is used for communicating with the second contact, selecting, via the input unit, one of the plurality of options for communicating with the second contact, and communicating, via the wireless communication unit, with the second contact via the selected communication option without displaying the personal contact information that is used for communicating with the second contact.

In another aspect, the present invention provides a mobile terminal including a display configured to display a list of contacts included on the mobile terminal, an input unit configured to receive a selection signal indication a selection of a first contact included in the list of contacts, and a wireless communication unit configured to access a web site corresponding to the first contact. Further, the display is further configured to display a list of contacts of the first contact included on the web site corresponding to the first contact without displaying personal contact information for the list of contacts of the first contact. In addition, the input unit is further configured to receive a selection signal indicating a selection of a second contact from the list of contacts of the first contact. Further, the display is further configured to display a plurality of options for communicating with the second contact without displaying personal contact information of the second contact that is used for communicating with the second contact. In addition, the input unit is further configured to receive a selection signal indicating a selection of one of the plurality of options for communicating with the second contact. Additionally, the wireless communication unit is further configured to communicate with the second contact via the selected communication option without displaying the personal contact information that is used for communicating with the second contact.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 23 is a rear perspective vide of the mobile terminal shown in FIG. 2A;

FIG. 4 is a flow chart illustrating a method of controlling a mobile terminal according to a second embodiment of the present invention;

DETAILED DESCRIPTION OF THE DISCLOSURE

Hereinafter, a mobile terminal relating to embodiments of the present invention will be described below in more detail with reference to the accompanying drawings. Further, the mobile terminal described in the specification can include a cellular phone, a smart phone, a laptop computer, a digital broadcasting terminal, personal digital assistants (PDA), a portable multimedia player (PMP), a navigation system and so on.

Figure 1:
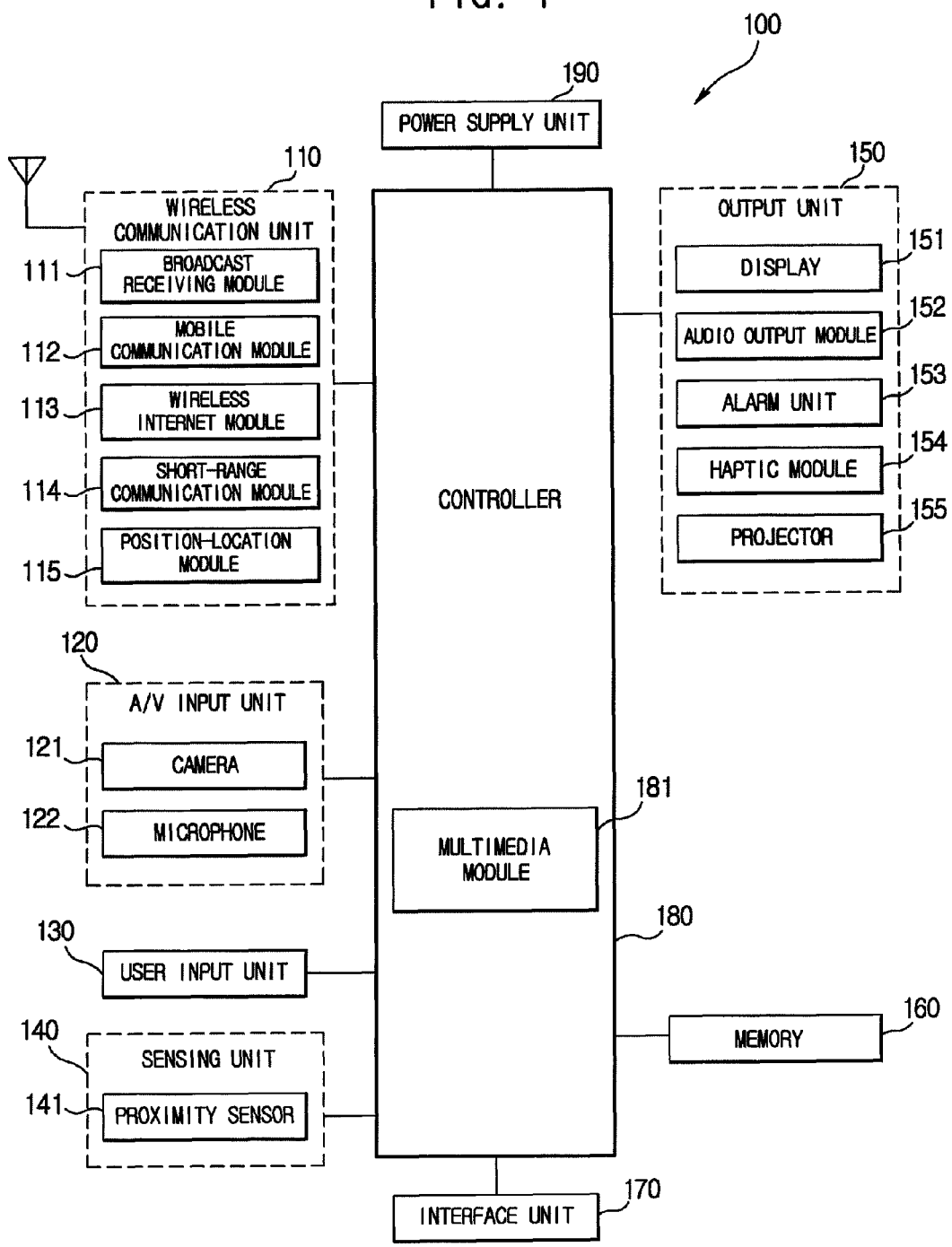
FIG. 1 is a block diagram of mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential parts and the number of components included in the mobile terminal can be varied.

In addition, the radio communication unit 110 includes at least one module that enables radio communication between the mobile terminal 100 and a radio communication system or between the mobile terminal 100 and a network in which the mobile terminal 100 is located. For example, in FIG. 1, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel. Also, the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals, but also signals in the form of a combination of a TV broadcasting signal and a radio broadcasting signal.

In addition, the broadcasting related information can be information on a broadcasting channel, a broadcasting program or a broadcasting service provider. The broadcasting related information can be provided even through a mobile communication network. In this instance, the broadcasting related information can be received by the mobile communication module 112. The broadcasting related information can also exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. In particular, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) system. The broadcasting receiving module 111 can also be constructed to be suited to broadcasting systems providing broadcasting signals other than the above-described digital broadcasting systems. The broadcasting signals and/or broadcasting related information received through the broadcasting receiving module 111 can also be stored in the memory 160.

Further, the mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages. The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. The local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal 100. A global positioning system (GPS) module is a representative example of the position information module 115. Further, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude coordinates at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. The processed image frames can be displayed on a display 151 included in the output unit 150. In addition, the image frames processed by the camera 121 can be stored in the memory 160 or transmitted to an external device through the radio communication unit 110. The mobile terminal 100 can also include at least two cameras according to constitution of the terminal.

Further, the microphone 122 receives an external audio signal in a call mode, a recording mode or a speed recognition mode and processes the received audio signal into electric audio data. The audio data can also be converted into a form that can be transmitted to a mobile communication base station through the mobile communication module 112 and output in the call mode. The microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The sensing unit 140 senses the current state of the mobile terminal 100, such as an open/close state of the mobile terminal 100, the position of the mobile terminal 100, whether a user touches the mobile terminal 100, the direction of the mobile terminal 100 and acceleration/deceleration of the mobile terminal 100 and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor 141.

In addition, the output unit 150 generates visual, auditory or tactile output and in FIG. 1 includes the display 151, an audio output module 152, an alarm 153, a haptic module 154, and a projector module 155. The display 151 displays information processed by the mobile terminal 100. For example, the display 151 displays a UI or graphic user interface (GUI) related to a telephone call when the mobile terminal is in the call mode. The display 151 also displays a captured or/and received image, UI or GUI when the mobile terminal 100 is in the video telephony mode or the photographing mode.

The display 151 can also include at least one of a liquid crystal display, a thin film transistor liquid crystal display, an organic light-emitting diode display, a flexible display and a three-dimensional display. Some of these displays can be of a transparent type or a light transmission type, which is referred to as a transparent display. The transparent display also includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display 151.

Further, the mobile terminal 100 can include at least two displays 151 according to constitution of the terminal. For example, the mobile terminal 100 can include a plurality of displays that are arranged on a single face at a predetermined distance or integrated. Otherwise, the plurality of displays can be arranged on different sides. In addition, when the display 151 and a sensor sensing touch (referred to as a touch sensor hereinafter) form a layered structure, which is referred to as a touch screen hereinafter, the display 151 can be used as an input device in addition to an output device. The touch sensor can be in the form of a touch film, a touch sheet and a touch pad, for example.

Also, the touch sensor can be constructed such that it converts a variation in pressure applied to a specific portion of the display 151 or a variation in capacitance generated at a specific portion of the display 151 into an electric input signal. The touch sensor can also be constructed such that it can sense pressure of touch as well as the position and area of touch. When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has wide application. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer is not in contact with the touch screen such that the location of the pointer on the touch screen is recognized is referred to as a "proximity touch" and an action of bringing the pointer into contact with the touch screen is referred to as a "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 also outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating a generation of an event of the mobile terminal 100. Examples of events generated in the mobile terminal 100 include receiving a call signal, receiving a message, inputting a key signal, inputting touch, etc. The alarm 153 can also output signals in forms different from video signals or audio signals, for example, a signal for indicating a generation of an event through vibration. The video signals or the audio signals can also be output through the display unit 151 or the audio output module 152.

In addition, the haptic module 154 generates various haptic effects that the user can feel. A representative example of the haptic effects is vibration. The intensity and pattern of vibration generated by the haptic module 154 can also be controlled. For example, different vibrations can be combined and output or sequentially output. The haptic module 154 can also generate a variety of haptic effects including an effect of stimulus according to an arrangement of pins vertically moving for a contact skin face, an effect of stimulus according to a jet force or sucking force of air through a jet hole or a sucking hole, an effect of stimulus of rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can not only transmit haptic effects through direct contact but also allow the user to feel haptic effects through kinesthetic sense of his or her fingers or arms. The mobile terminal 100 can also include at least two or more haptic modules 154 according to constitution of the mobile terminal.

The projector module 155 is an element for performing an image projector function using the mobile terminal 100. That is, the projector module 155 can display an image, which is identical to or partially different at least from the image displayed on the display 151, on an external surface such as a wall or screen according to a control signal of the controller 180. In particular, the projector module 155 includes a light source generating light (e.g., laser) for projecting an image, an image producing unit for producing an image to be projected using the light generated from the light source, and a lens for enlarging the image to be projected in a predetermined focus distance. In addition, the projector module 155 can include an adjustment device for adjusting an image projected direction by mechanically moving the lens or the whole module.

Further, the projector module 155 can be classified into a CRT (cathode ray tube) module, an LCD (liquid crystal display) module, a DLP (digital light processing) module or the like according to a device type of a display mechanism. In particular, the DLP module is operated by the mechanism of enabling the light generated from the light source to reflect on a DMD (digital micro-mirror device) chip and can be advantageous for the downsizing of the projector module 151. Preferably, the projector module 155 can be provided in a length direction of a lateral, front or backside direction of the mobile terminal 100. The projector module 155 can also be provided to any portion of the mobile terminal 100.

In addition, the memory 160 stores a program for the operation of the controller 180 and temporarily stores input/output data (for example, phone book, messages, still images, moving images, etc.). The memory 160 can also store data about vibrations and sounds in various patterns, which are output when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

Further, the interface 170 serves as a path to all external devices connected to the mobile terminal 100. The interface 170 receives data or power from the external devices and transmits the data or power to the internal components of the mobile terminal 100 or transmits data of the mobile terminal 100 to the external devices. The interface 170 can also include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

Also, the interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. In FIG. 1, the controller 180 includes a multimedia module 181 for playing multimedia. The multimedia module 181 can be included in the controller 180 or separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Further, various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. The embodiments can also be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
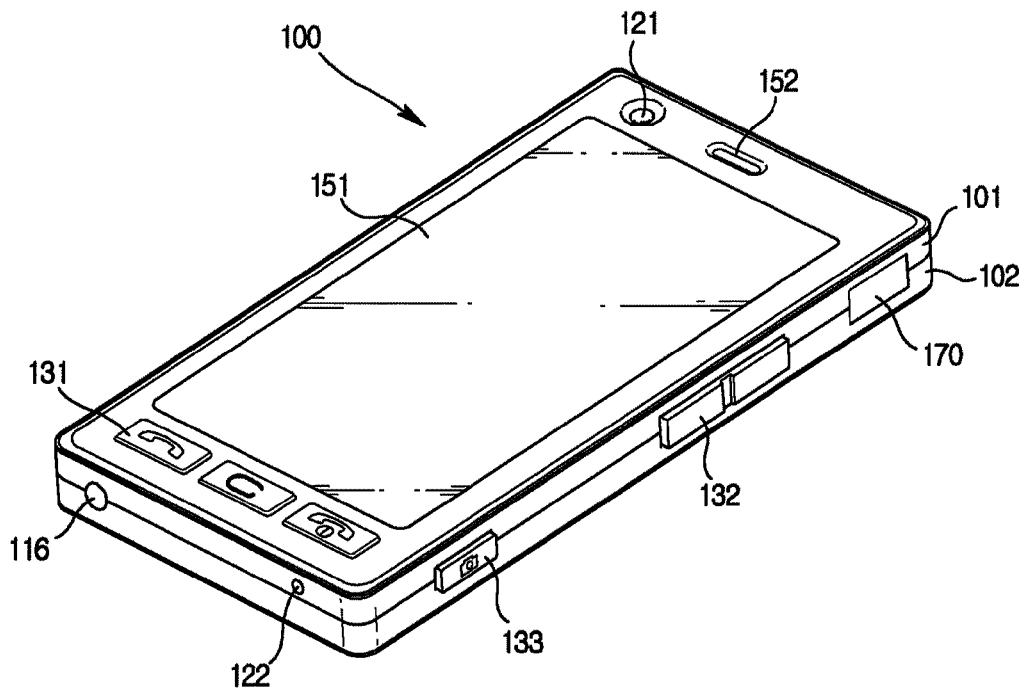
FIG. 2A is a front prospective view of a mobile terminal according to an embodiment of the present invention.

Next, FIG. 2A is a front perspective view of a mobile terminal or a handheld terminal 100 according to an embodiment of the present invention. As shown, the mobile terminal 100 is a bar type terminal body. However, the present invention is not limited to a bar type terminal and can be applied to terminals of various types including a slide type, folder type, swing type and swivel type terminals having at least two bodies that are relatively movably combined.

In addition, the terminal body includes a case (a casing, a housing, a cover, etc.) forming the exterior of the terminal 100. In the present embodiment, the case is divided into a front case 101 and a rear case 102. Various electronic components are also arranged in the space formed between the front case 101 and the rear case 102. At least one middle case can be additionally arranged between the front case 101 and the rear case 102. The cases can also be formed of plastics through injection molding or be made of a metal material such as stainless steel (STS) or titanium (Ti).

In addition, the display 151, the audio output unit 152, the camera 121, user input units 131 and 132 of the user input unit 130 (FIG. 1), the microphone 122 and the interface 170 are arranged in the terminal body, specifically, in the front case 101. Also, the display 151 occupies most part of the main face of the front case 101. The audio output unit 152 and the camera 121 are arranged in a region in proximity to one of both ends of the display 151 and the user input unit 131 and the microphone 122 are located in a region in proximity to the other end of the display 151. In addition, the user input unit 132 and the interface 170 are arranged on the sides of the front case 101 and the rear case 102.

Further, the user input unit 130 is operated to receive commands for controlling the operation of the handheld terminal 100 and can include the operating units 131 and 132. The operating units 131 and 132 can be referred to as manipulating portions and employ any tactile manner in which a user operates the operating units 131 and 132 while having tactile feeling. The operating units 131 and 132 can also receive various inputs. For example, the operating unit 131 receives commands such as start, end and scroll, and the second operating unit 132 receives commands such as control of the volume of sound output from the audio output unit 152 or conversion of the display 151 to a touch recognition mode.

Figure 2B:
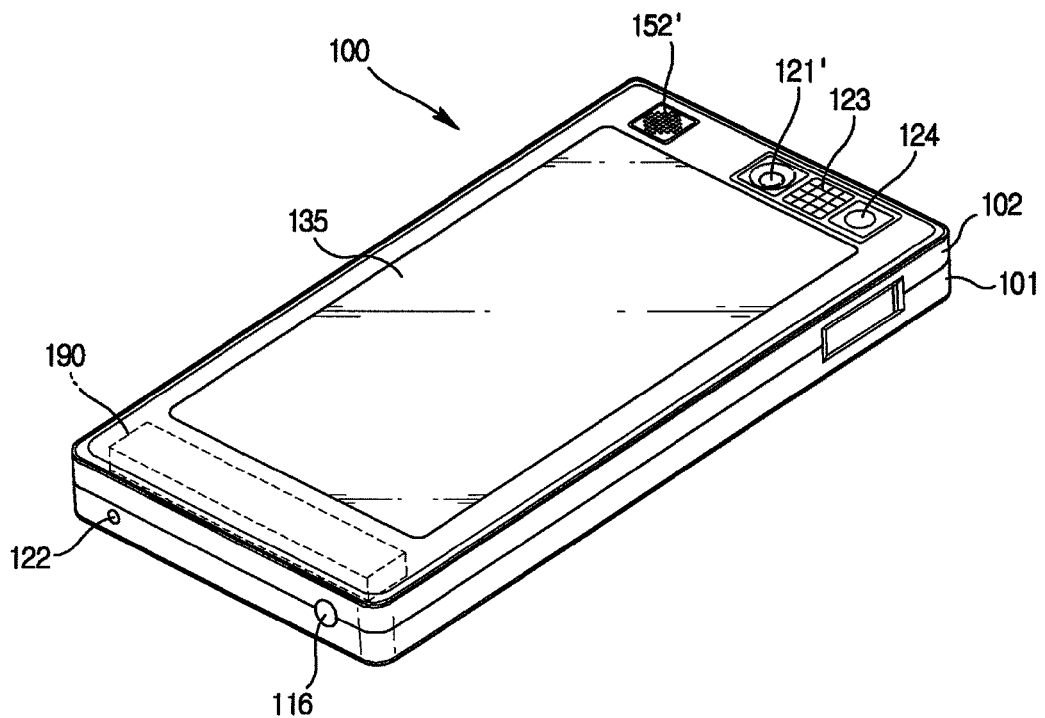

Next, FIG. 2B is a rear perspective view of the mobile terminal 100 shown in FIG. 2A according to an embodiment of the present invention. Referring to FIG. 2B, a camera 121' is additionally attached to the rear side of the terminal body, that is, the rear case 102. The camera 121' has a photographing direction opposite to that of the camera 121 shown in FIG. 2A and can have pixels different from those of the camera 121 shown in FIG. 2A. For example, it is preferable that the camera 121 has low pixels such that it can capture an image of the face of a user and transmit the image to a receiving part for video telephony, while the camera 121' has high pixels because it captures an image of a general object and does not immediately transmit the image in many instances. The cameras 121 and 121' can also be attached to the terminal body such that they can be rotated or pop-up.

A flash bulb 123 and a mirror 124 are also arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'. An audio output unit 152' is also provided on the rear side of the terminal body. The audio output unit 152' can thus achieve a stereo function with the audio output unit 152 shown in FIG. 2A and be used for a speaker phone mode when the terminal is used for a telephone call.

A broadcasting signal receiving antenna 124 is also attached to the side of the terminal body in addition to an antenna for telephone calls. The antenna 124 constructing a part of the broadcasting receiving module 111 shown in FIG. 1 can be set in the terminal body such that the antenna 124 can be retracted from the terminal body. Further, the power supply 190 for providing power to the handheld terminal 100 is set in the terminal body. The power supply 190 can be included in the terminal body or detachably attached to the terminal body. A touch pad 135 for sensing touch is also attached to the rear case 102. The touch pad 135 can be of a light transmission type as the display 151. In this instance, if the display 151 outputs visual information through both sides thereof, the visual information can be recognized through the touch pad 135. The information output through both sides of the display 151 can also be controlled by the touch pad 135. Otherwise, a display is additionally attached to the touch pad 135 such that a touch screen can be arranged even in the rear case 102.

The touch pad 135 also operates in connection with the display 151 of the front case 101. The touch pad 135 can be located in parallel with the display 151 behind the display 151, and can be identical to or smaller than the display 151 in size.

Figure 3:
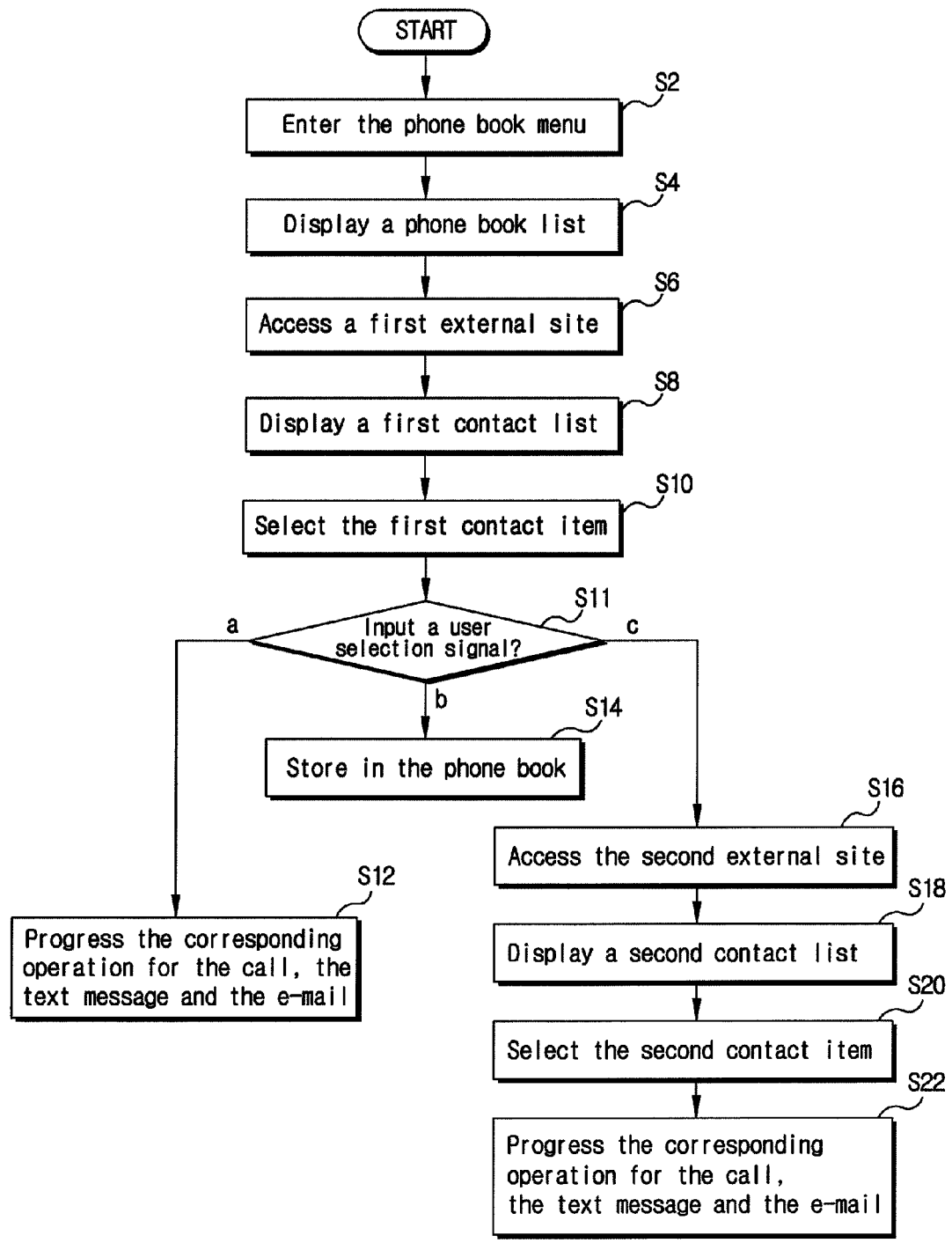
FIG. 3 is a flow chart illustrating a method of controlling a mobile terminal according to a first embodiment of the present disclosure.

Turning next to FIG. 3, which is a flow chart illustrating a method of controlling a mobile terminal according to a first embodiment of the present invention. As shown in FIG. 3, the user enters the phone book menu using the user input unit 130 (S2). Then, the controller 180 displays a phone book list on the display unit 151 (S4). The user can select one of the users in a phone book list to perform a voice call, a video call, a text message, and an e-mail to the selected user.

The phone book list can also include Internet path information that the user can select to be connected to a web site. In this instance, the controller 180 drives the wireless communication module 110 to access a first external site using the Internet path information (S6). Next, the controller 180 controls the wireless communication module 110 to receive a first contact list stored in the first external site, and displays the received first contact list on the display unit 151 (S8). The first contact list includes contacts of a user on the first external site.

For example, a first user operating the mobile terminal can connect to a website such as FACEBOOK to obtain the contact list of a second user on the website FACEBOOK. The second user has also allowed or OKd the first user from seeing and retrieving his or her contact list. The contact list can be a list of friends of the second user, for example. Further, contacts included in the second user's contact list include, for example, title information such as a name and communication information such as phone number, e-mail address, and address of a homepage of the list of friends of the second user.

However, according to an embodiment of the present invention, when the contact list of the second user is displayed on the display unit 151 of the first user, only the title information is displayed (i.e., the communication information is not displayed). Alternatively, the controller 180 can receive the contact list including only the title information and display the contact list having only the title information on the display unit 151. Thus, the first user can view contacts of the second user. In more detail, if Jim is the first user, and Jill is the second user, Jim can receive and view the contacts or friends of Jill. However, Jim can only see the title information for the contacts or friends of Jill and cannot see communication information (e.g., the phone number, email address, etc.) of the friends of Jill. Jim can then communicate with contacts or friends of Jill by selecting the title information, (e.g., name), which includes the information to contact the friend (but the information is not displayed to Jim).

Then, when the list of contacts of the second person are displayed on the mobile terminal of the first person, the first user can select a contact item or a third user in the displayed list of contacts of the second user (S10). For example, Jim can select the user Mark who is included in Jill's contact list. The controller 180 then checks to see if the selection corresponds to transmitting data to the selected contact item or third user, storing the selected contact item or third user in the mobile terminal of the first user, or connecting to another external site of the selected contact item or third user (S11). That is, the first user selects a contact item included in the list of contacts for the second user and inputs a user selection signal for executing an operation that the user wants.

In addition, if the first user inputs the selection signal for transmitting data (reference character "a" in S11), the controller 180 performs the desired operation including calling the selected contact item or third user, e-mailing the selected contact item or third user, and text messaging the selected contact item (S12) or third user. If the first user inputs the selection signal for storing the contact item or third user (reference character "b" in S11), the controller 180 stores the selected contact item or third user in the phone book (S14). If the first user inputs the selection signal for contacting to the external site of the selected contact item or third user (reference character "c" in S11), the controller 180 accesses the second external site such as a mini homepage, blog, etc. of the selected contact item (S16). Thus, Jack can connect to the external site corresponding to Mark's (the third user) homepage, blog, etc.

Further, regarding the selection signal corresponding to accessing the external site of the selected contact item included in the second user's contact list, the controller 180 receives and displays a list of contacts of the selected contact item or the third user (S18). Further, as discussed previously, the controller 180 displays the contact list of the third user with only title information, and does not display the corresponding communication information. The first user of the mobile terminal can then select a contact from the displayed contact list of the third user and can text message, email, stored the information, etc. as discussed above (S20). That is, the user can perform the transmission of data such as a call, a text message and an e-mail, store the contact item in their phone book, and access yet another external site.

Further, in the first embodiment, the title information is displayed and the communication information is not displayed. In an alternative embodiment, a manager or user of the external site can set the range of information that can be displayed. For example, if the manager decides the title information and the e-mail information can be displayed, the title information and the e-mail information are displayed, but the phone number and the address of the blog are not displayed. The individual users or contacts in each contact list can also set up what information can be disclosed or displayed.

Thus, in the first embodiment of the present invention, the first user Jim can receive and display the contact list of the second user Jill. Jim can then view the contacts included in Jill's contact list and select one of the contacts in Jill's contact list. For example, if Jill's contact list include a person named Mark, Jim can then email, text message, call, etc. the third person Mark (i.e., the selected contact from Jill's contact list). Jim can also receive and display the contact list of Mark and call, email, text message, store information, access a contact list, etc. of a person included in Mark's contact list.

Next, FIG. 4 is a flow chart illustrating a method of controlling a mobile terminal according to a second embodiment of the present application. As shown in FIG. 4, the user of the mobile terminal (referred to as the first user) can enter a gallery or picture menu using the user input unit 130 (S30), and image data stored in the gallery menu is displayed on the display 151 (S32). Further, the image data can be displayed in the form of thumbnails. Moreover, if the user sets a searching range and inputs a search word, only the image or images that satisfy the search condition are displayed, which will be explained in more detail referring to FIGS. 8 and 9.

In addition, according to the second embodiment of the present invention, the image data includes a tag corresponding to Internet path information, for example. Further, the controller 180 can distinctively display image data having the tag or Internet path information from other image data. Then, when the user selects an image having the tag corresponding to the Internet path information, the controller 180 drives the wireless communication module 110 to access an external site corresponding to the Internet path information (S34).

The controller 180 then receives a contact list stored in the external site through the wireless communication module 110 and displays the received contact list on the display 151 (S36). The user can then perform similar operations as those in steps S10-S22 in FIG. 3, and thus a detailed description of these features is not repeated.

Therefore, according to the second embodiment of the present invention, the user can select an image including a tag corresponding to Internet path information to communicate with another person using the contact list stored in the external site.

Figure 5A:
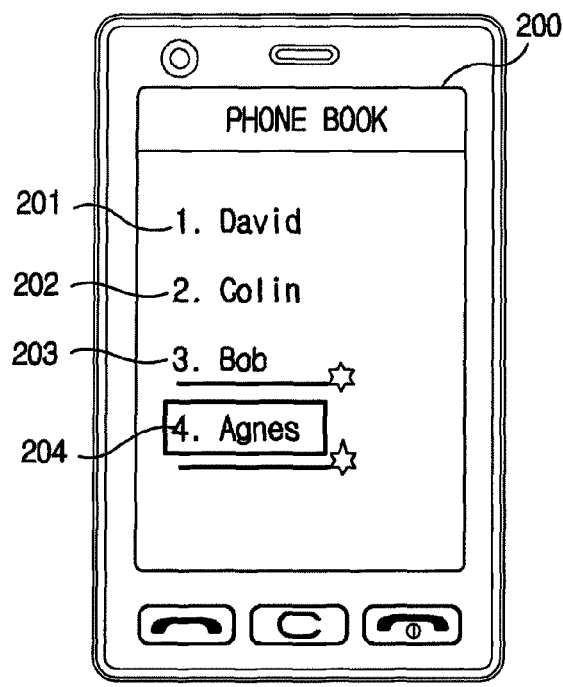
FIGS. 5a-5f are overviews of display screens illustrating features of the first embodiment of the present invention.

Next, FIGS. 5a-5f include overviews of display screens illustrating an example implementation of the first embodiment of the present invention. As shown in FIG. 5a, the controller 180 displays a phone book menu screen 200 on the display 151. In particular, the phone book menu screen 200 includes a phone book list having phone book items 201-204. Further, the phone book items 203 and 204 are distinctively displayed from the phone book items 201 and 202 to inform the user the phone book items 203 and 204 include tags corresponding to Internet path information and the phone book items 201 and 202 do not include tags corresponding to Internet path information.

Figure 5B:
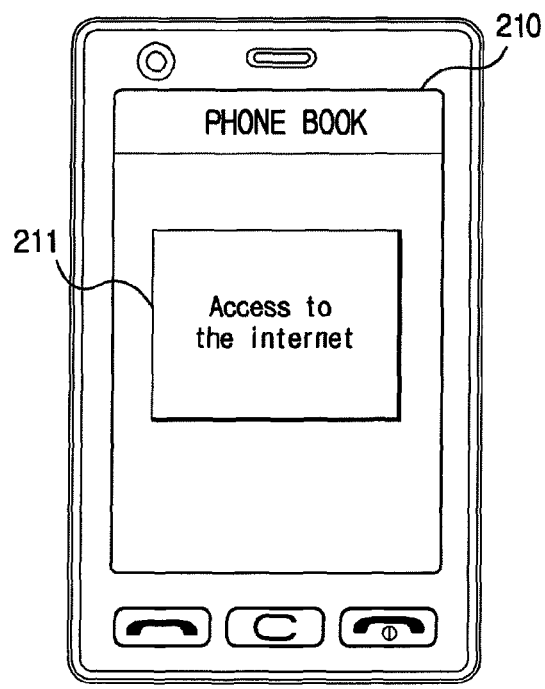

Further, as discussed above, the Internet path information may be path information for a mini homepage, blog, personal website, etc. Then, if the user selects one of the phone book items 203 and 204 using the user input unit 130 or by touching the corresponding item 203 and 204, the controller 180 displays an Internet access screen 210 on the display 151 as shown in FIG. 5b. In the example shown in FIG. 5a, the user has selected "Anges" from this list of people displayed in the phone book menu screen 200. The Internet access screen 210 can also include an Internet access message 211 informing the user the mobile terminal 100 is attempting to connect to the Internet.

Figure 5C:
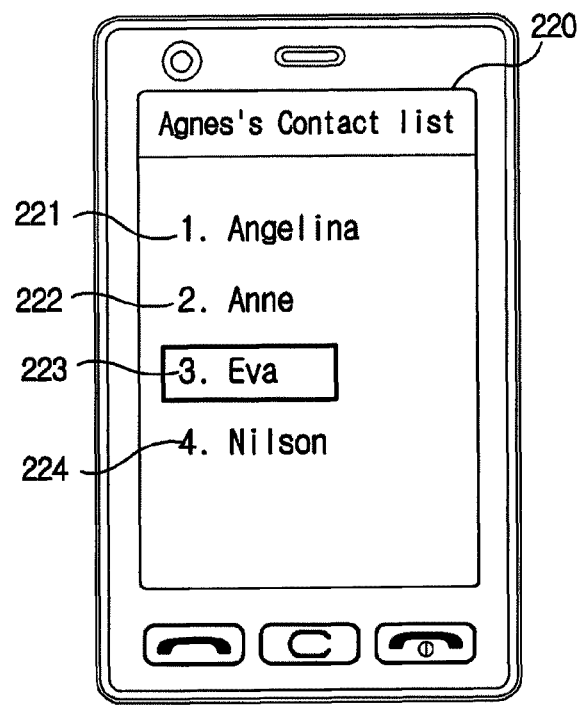

Then, as shown in FIG. 5c, when the controller 180 successfully connects to the website corresponding to Anges that was identified by the linked tag Internet path information, the controller 180 displays the contact list screen 220 of the second user (i.e., Agnes in this example) on the display 151. Further, the contact list screen 220 for Agnes includes contact items 221-224.

As shown in FIG. 5c, the displayed contact items 221-224 include only title information (e.g., names) in this example. In addition, the communication information such as a phone number, e-mail information, and access path information for a particular user is hidden and not displayed. Therefore, the privacy of the contacts in the second user's contact list is maintained.

Figure 5D:
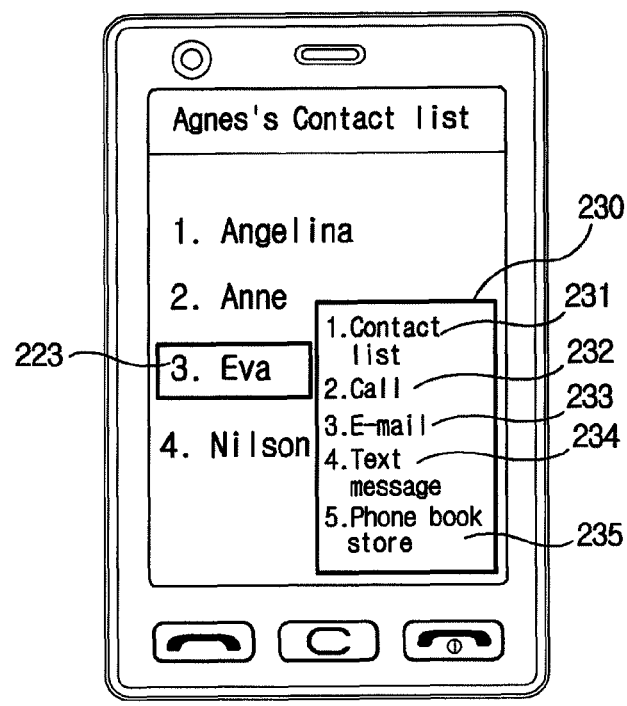

Then, when the user selects one of the contact items 221-224 in FIG. 5c, the controller 180 displays a first contact icon window 230 on the display unit 151 as shown in FIG. 5d. In the example shown in FIGS. 5c and 5d, the user has selected the contact item "Eva." As shown in FIG. 5d, the first contact icon window 230 includes a contact list icon 231, a call icon 232, an email icon 233, a text message icon 234 and a phone book store icon 235.

Figure 5E:
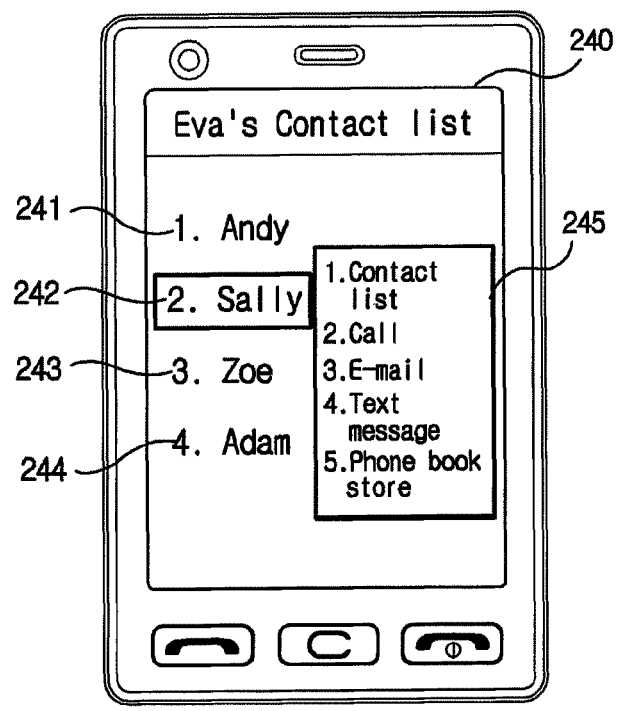

Then, if the user selects the contact list icon 231, the controller 180 drives the wireless communication module 110 to access Eva's blog or mini homepage, for example, and displays a contact list 240 corresponding to Eva's contact list on the display 151 as shown in FIG. 5e. If the user selects the call icon 232 in FIG. 5d, the controller 180 drives the communication module 110 to transmit a call signal to Eva's terminal to attempt a call connection to Eva. In addition, if the user selects the email icon 233, the controller 180 drives the communication module 110 to display an e-mail screen on the display 151 for sending an email to a personal e-mail address of Eva 223. Note, however, that the phone number and email address are not displayed in FIG. 5*d*, bur rather only the title or name of the users in Agnes's contact list are displayed. Thus, the personal information of the users in Agnes's content is protected.

Also, if the user selects the text message icon 234 in FIG. 5*d*, the controller 180 drives the communication module 110 to display a text message screen on the display unit 151 for sending a text message to Eva. If the user selects the phone book store icon 235, the controller 180 automatically stores the title information and the hidden communication information of Eva in the phone book menu of the first user. The hidden communication information however is not displayed to the first user and can be encrypted to further enhance the security of the communication or personal information.

Further, when the user selects the contact list icon 231 in FIG. 5*d*, the controller 180 displays a second contact list (Eva's contact list) 240 on the display unit 151 as shown in FIG. 5*e*. As shown, the second contact list 240 includes second contact items 241-244 corresponding to Eva's contacts. Then, when the user selects one of the second contact items 241-244, the controller 180 displays a second contact icon window 245 on the display unit 245.

Figure 5F:
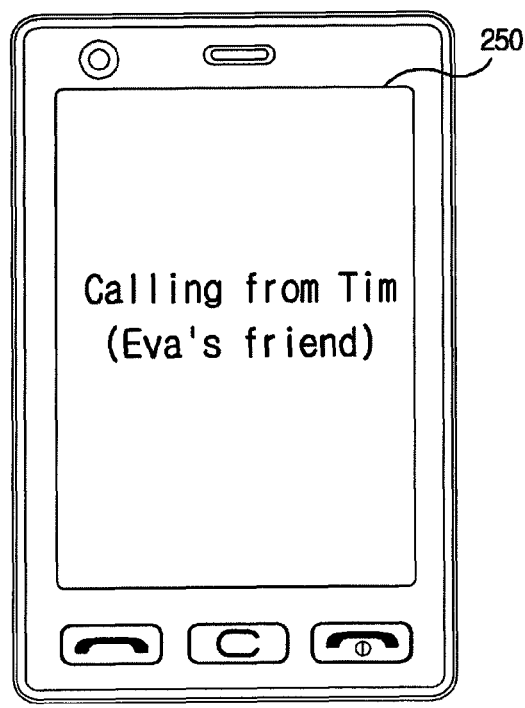

Also, if the user selects the call icon included in the second contact icon window 245, the controller 180 drives the wireless communication module 110 to transmit call signal to Sally's terminal to attempt to connect the call to Sally. Further, the controller 180 can transmit the title information of the first and the second contacts together. Also, as shown in FIG. 5*f*, the controller 180 on Sally's terminal can display a reception ready screen 250 using the received title information of the first and the second contact titles. For example, the controller 180 on Sally's terminal can display the message "Call from Tim who is a friend of Eva" which includes the caller's information on the reception ready screen 250. However, the communication information is not displayed in the reception ready screen 250. In the above example, Tim is a user of the mobile terminal 100 and Sally is a friend of Eva.

The functions included in the second contact icon window 245 are similar to the function included in the first contact icon window 230, and therefore a further detailed description of the functions in the second contact icon window 245 will not be repeated.

Figure 6A:
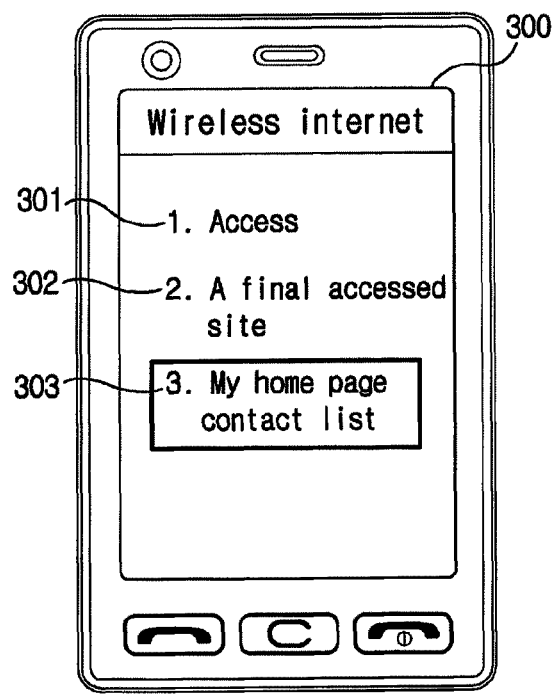
FIGS. 6a-6b are overviews of display screens illustrating other features of the first embodiment of the present invention.
Figure 6B:
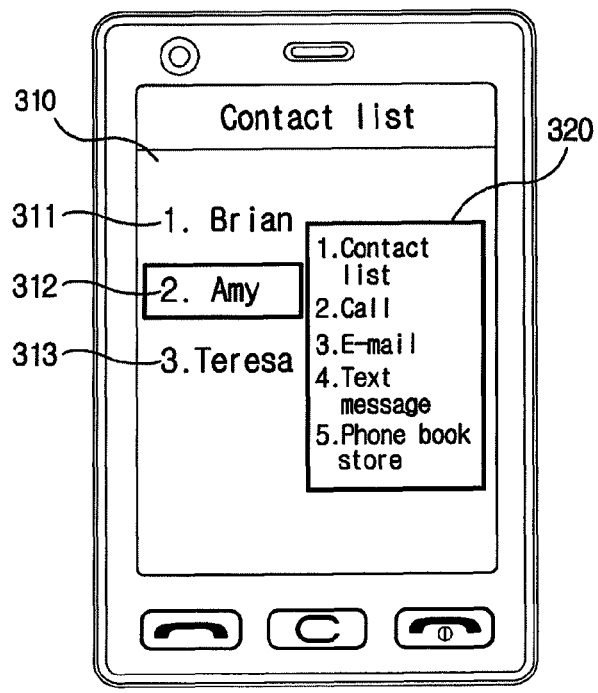

Next, FIGS. 6*a* and 6*b* are overviews of display screens illustrating a second implementation of the first embodiment of the present invention. In particular, FIG. 6*a* illustrates the controller 180 displaying a wireless Internet connection menu screen 300, which includes an access icon 301, a final accessed site icon 302, and my home page contact list icon 303.

If the user of the mobile terminal 100 selects the access icon 301, the controller 180 drives the wireless communication module 110 to enter the web page having a predetermined address and displays the accessed web page on the display unit 151. If the user selects the final accessed site icon 302, the controller 180 drives the wireless communication module 110 to access the final accessed site, and displays the accessed site on the display unit 151.

If the users selects the my home page contact list icon 303 as shown in FIG. 6*a*, the controller 180 drives the wireless communication module 110 to access the user's mini home page or blog, which has been previously stored so as to receive the contact list. Then, as shown in FIG. 6*b*, the controller 180 displays a contact list 310 on the display 151. As shown, the contact list 310 includes a plurality of the contact icons 311-313.

Then, if the user selects one of the contact icons 311-312, the controller 180 displays a contact icon window 320 on the display 151. FIG. 6*b* illustrates the user selecting the contact icon 312 for Amy. The functions in the contact icon window 320 are the same functions as those described FIGS. 5*d* and 5*e*, and thus a detailed description is omitted.

Also, in the second implementation, an example is illustrated where the contact list is in the personal blog or the mini homepage. However, the present disclosure is not limited to the example, and the user can set up another person's mini homepage or blog to receive the contact list from them.

Figure 7A:
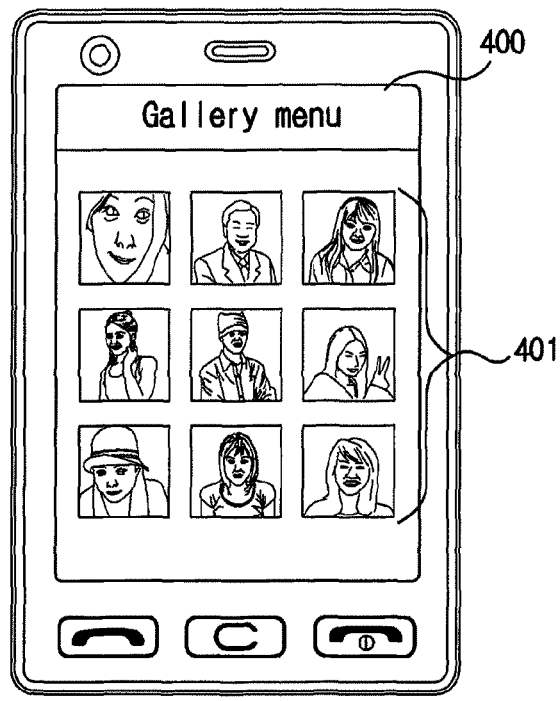
FIGS. 7a and 7b are overviews of display screens illustrating features of the second embodiment of the present invention.
Figure 7B:
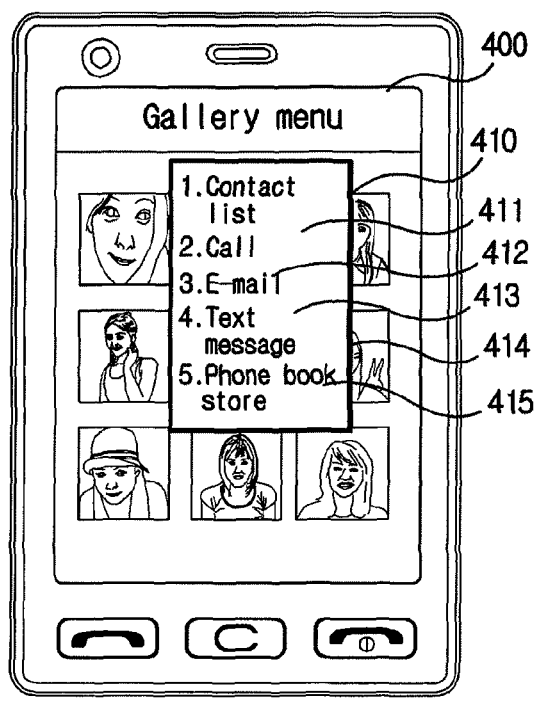

Next, FIGS. 7*a* and 7*b* are overviews of display screens illustrating features of the second embodiment of the present invention. In particular, FIG. 7*a* illustrates the controller 180 displaying a gallery menu screen 400 including a plurality of the images in the form of thumbnails. Further, one or more images can be linked with tag information such as a photographing date, a photographing place, a photographer's memo, color information and communication information including an web address, a phone number of the photographer or person photographed, and a e-mail address of the photographer or person photographed. Further, the image or images linked with the communication information are preferably displayed so as to be distinguished from images that are not linked with the communication information.

In addition, if the user selects the image linked with the communication information, the controller 180 displays an image contact window 410 on the display 151 as shown in FIG. 7*b*. As shown, the image contact window 410 includes a contact list icon 411, a call icon 412, an email icon 413, a text message icon 414 and a phone book storage icon 415. The operations after selecting the icons 411-415 have already been described above with respect to FIG. 5*d*, for example, and thus will not be repeated here.

Figure 8A:
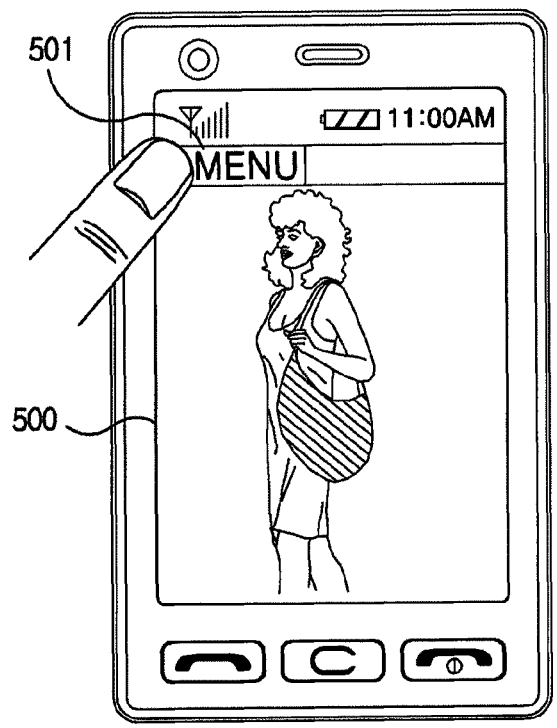
FIG. 8a-8e are overviews of display screens illustrating other features of the second embodiment of the present invention.

Next, FIGS. 8*a*-8*e* are overviews of display screens illustrating a method for searching contents which may be applied to the first or the second embodiments of the present disclosure. As shown in FIG. 8*a*, if the gallery menu is entered, the controller 180 reads the gallery or images stored in the memory 160 of the mobile terminal 100 or on an external site and displays a gallery screen 500 on the display 151.

Figure 8B:
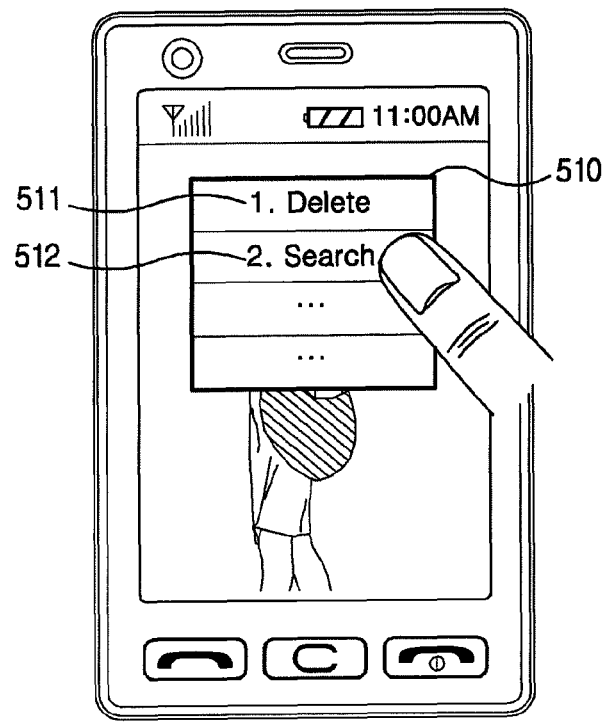

Then, if the user selects a menu icon 501 as shown in FIG. 8*a*, the controller 180 displays a search menu window 510 on the display 151 as shown in FIG. 8*b*. Further, in FIG. 8*b*, the search menu window 510 includes a delete icon 511 and a search icon 512. If the user selects the delete icon 511, the controller 180 deletes the displayed image. If the user selects the search icon 512, the controller 180 displays a search range set up window 515 as shown in FIG. 8*c*.

Figure 8C:
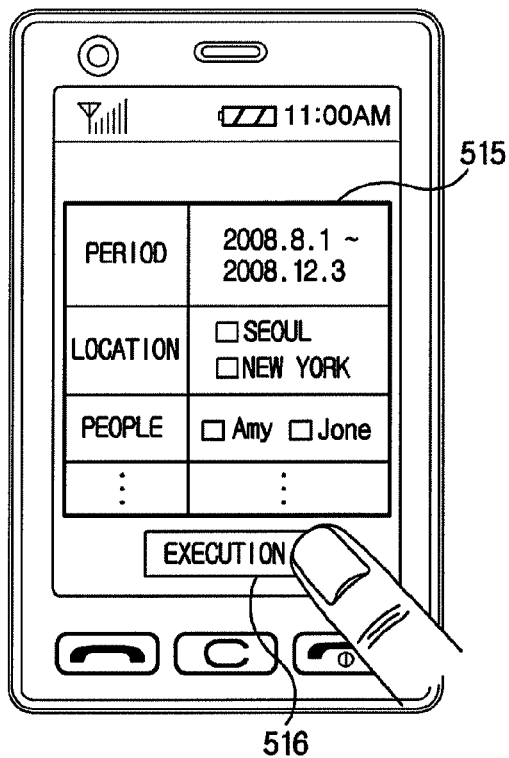

Further, in the example shown in FIG. 8*c*, the search range set up window 515 includes tag information stored in the displayed contents (e.g., a tag on the location, a tag on a photographing time, a tag on tapes of cameras), and other information such as a color, a person who has uploaded the images, an identity of a person included in the displayed contents, etc.

Figure 8D:
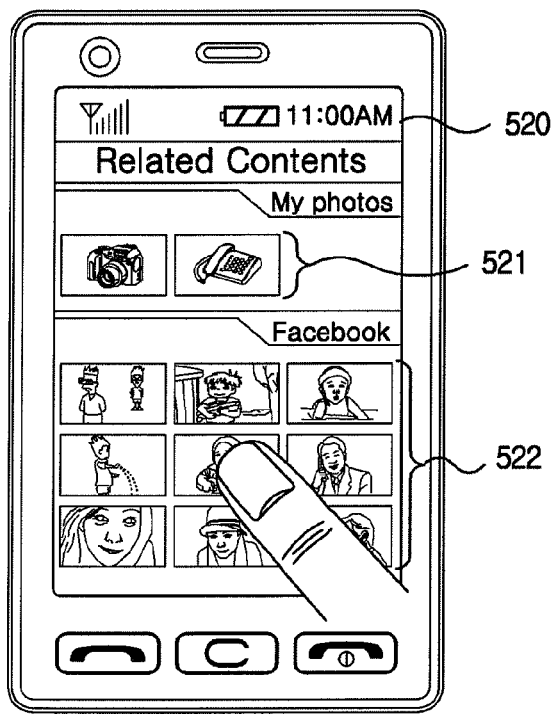

Thus, the user can use the search range set up window 515 to select the searching range that the user wants. After completing the search selection, the controller 180 displays a related contents screen 520 on the display 151 based on the result of the searching contents as shown in FIG. 8*d*. The related contents may include contents 521 stored in the mobile terminal or contents 522 stored in the external site as shown in FIG. 8*d*. Namely, the controller 180 can execute the search based on contents stored in the mobile terminal 100 or the external site. The contents 521 and 522 can also include Internet path information.

Figure 8E:
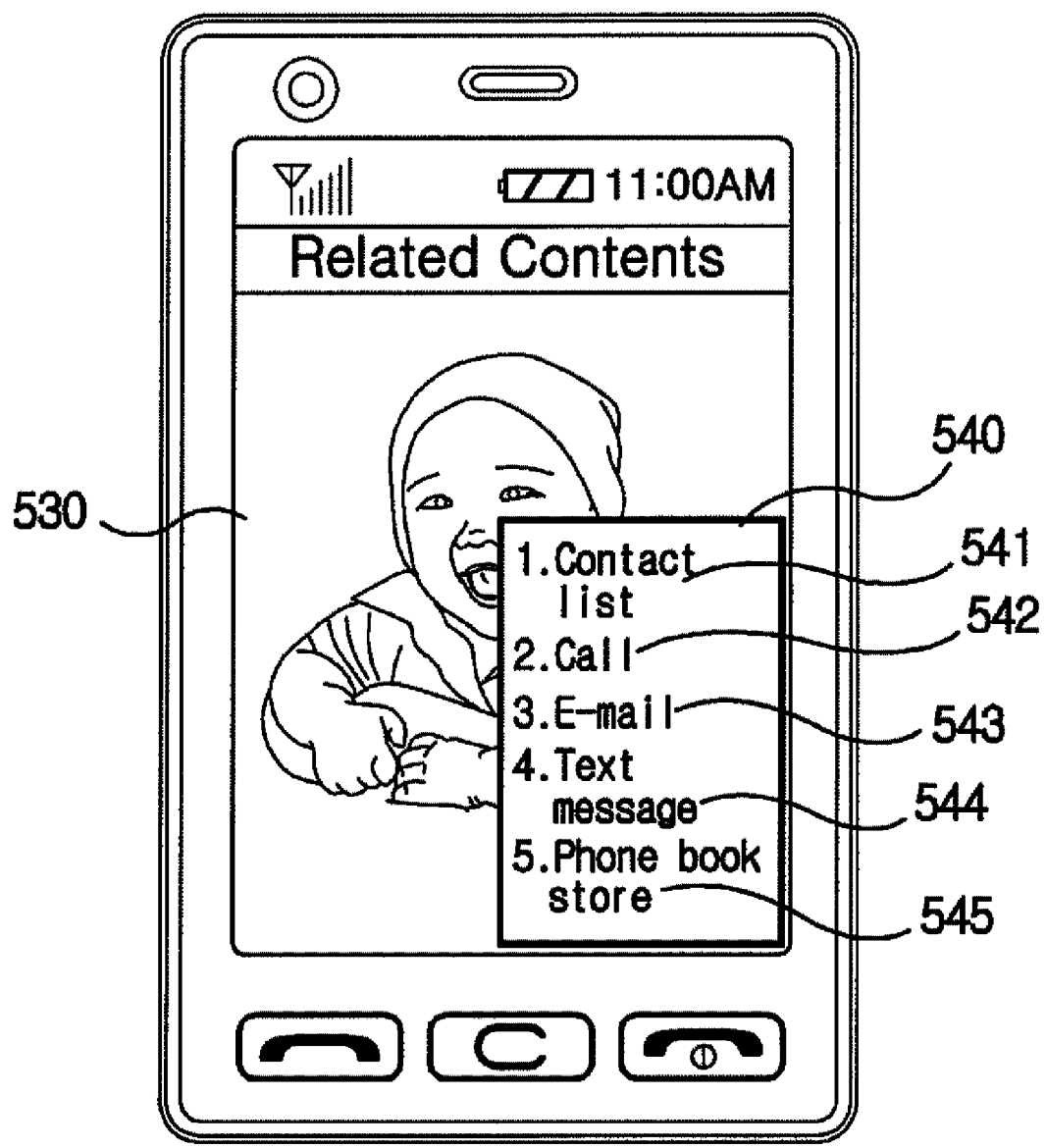

Thus, if the user selects any one of the contents 522 stored in the external site, the controller 180 displays a contents screen 530 including the selected contents as shown in FIG. 8e. Then, when the user selects the contents screen 530, the controller 180 displays an image contact window 540 on the display 151 as shown in FIG. 8e. Again, the image contact window 540 includes a contact list icon 541, a call icon 542, an e-mail icon 543, a text message icon 544, and a phone book storage icon 545. Further, the operations after selecting any of these icons have already been explained and thus a detailed description is omitted. Accordingly, the user can easily search for contents.

Figure 9A:
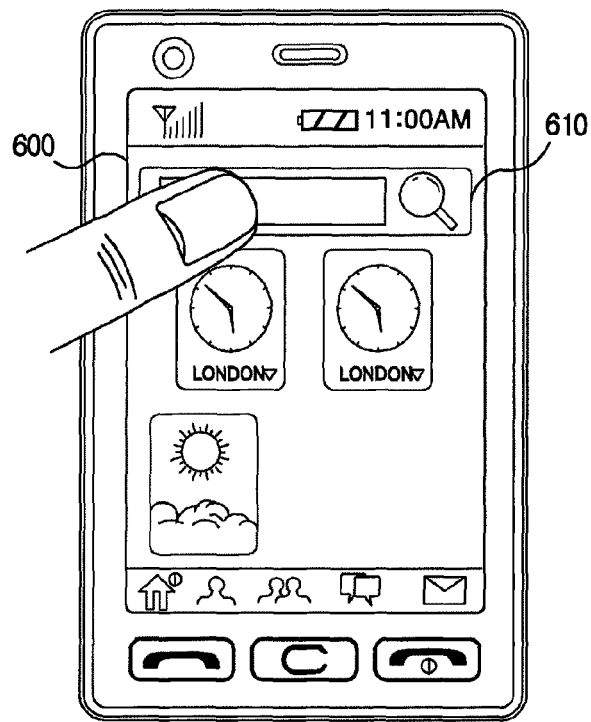
FIGS. 9a-9c are overviews of display screens illustrating a method for searching contents according to an embodiment of the present invention.
Figure 9B:
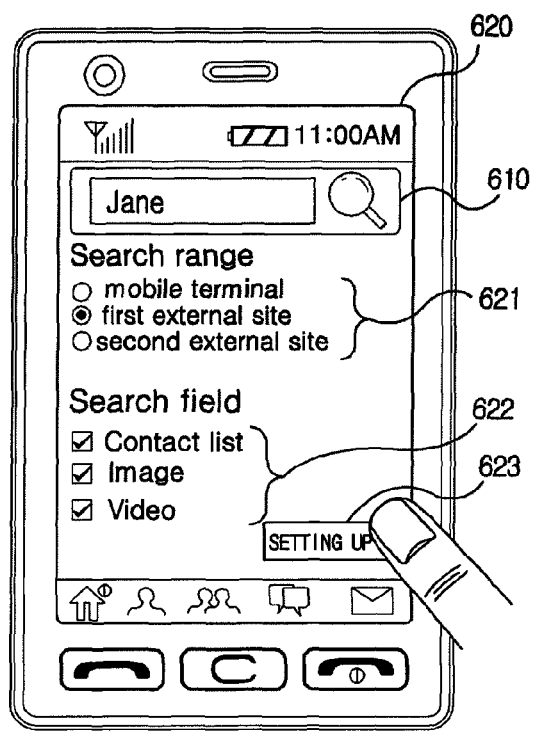
Figure 9C:
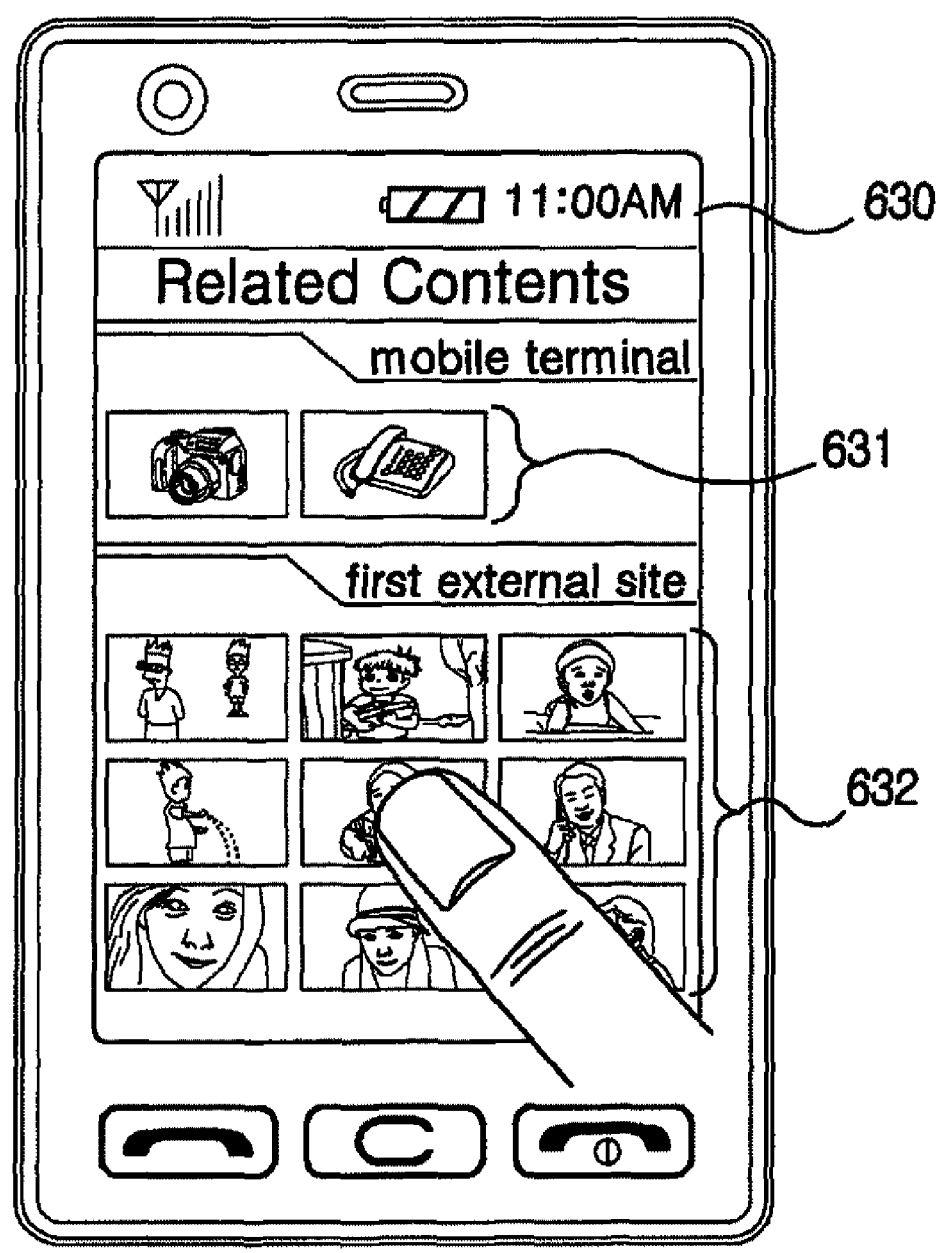

Next, FIGS. 9a-9c are overviews of display screens illustrating another method for searching contents which may be applied to the first and second embodiments of the present disclosure. As shown in FIG. 9a, the controller 180 displays a search searching screen 600 including a content searching window 610 for searching contents. If the user then inputs a signal for setting up a search range, the controller 180 displays a search range set up screen 620 on the display 151 as shown in FIG. 9b.

In addition, the signal for setting up the search range is generated by selecting the searching window 610 or by selecting an independent icon which is additionally displayed. Also, in FIG. 9b, the search range set up screen 620 includes a search range setting up icon 621 and a search field setting up icon 622. In particular, the search range setting up icon 621 includes icons for setting up the search range such as contents stored in the mobile terminal 100, contents stored in the first external site, contents stored in the second external site and so on.

Further, the search field setting up icon 622 includes icons for setting up the search criteria such as a contact list, an image, a video and so on. The user can then select a setting up icon 623 after setting the search range or the search field, and the controller 180 searches the selected search criteria. In FIG. 9b, the user inputs the search word 'Jane' in the contents search window 610. The controller 180 then executes the search using the input search word. Namely, the controller 180 searches the contents related to "Jane' based on the criteria.

As shown in FIG. 9c, when the search is completed, the controller 180 displays a related contents screen 630 on the display 151 based on the searched contents. In FIG. 9c, the related contents screen includes contents 631 stored in the mobile terminal 100 and contents 632 stored in the first external site. The contents may also be linked to Internet path information such that if the user selects the contents, the controller 180 display the image contact window on the display 151. The functions included in the contact window have already been discussed and thus will not be repeated. Accordingly, the user can set a desired search range and search for particular contents.

Next, FIGS. 10a-10d are overviews of display screens illustrating a method for setting up a privacy disclosure range which can be applied to the first or second embodiments of the present disclosure.

Figure 10A:
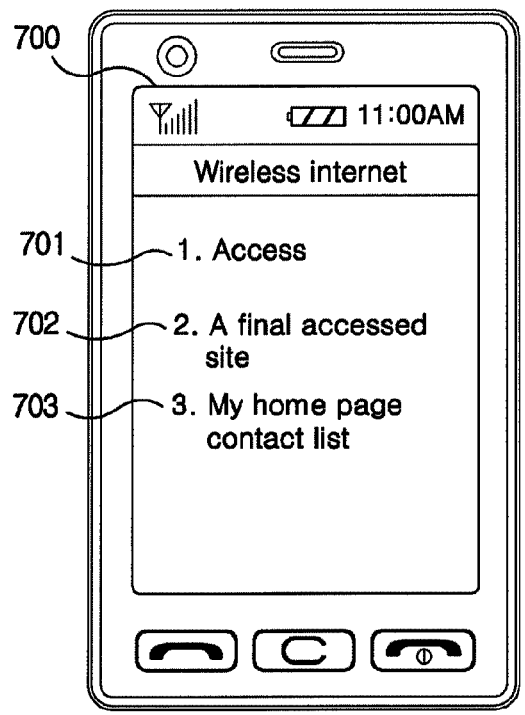
FIGS. 10a-10d are overviews illustrating a method for setting a privacy disclosure range according to an embodiment of the present invention.

In more detail, FIG. 10a illustrates the controller 180 displaying a wireless connection menu screen 700 on the display 151. As shown, the wireless connection menu screen includes an access icon 701, a final access site icon 702, and a my homepage contact list icon 703. If the user selects the my home page contact list icon 703, the controller 180 drives the wireless communication module 110 to access the user's mini home page or blog, which in this example includes the user's contact list.

Figure 10B:
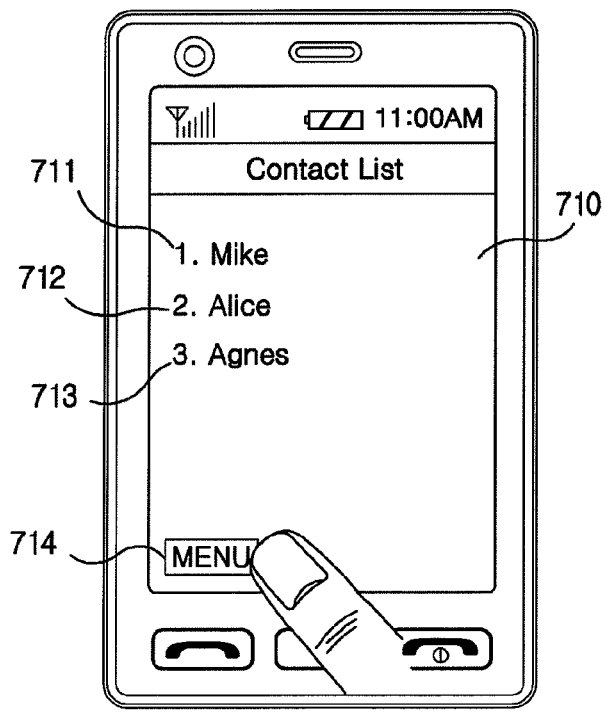
Figure 10C:
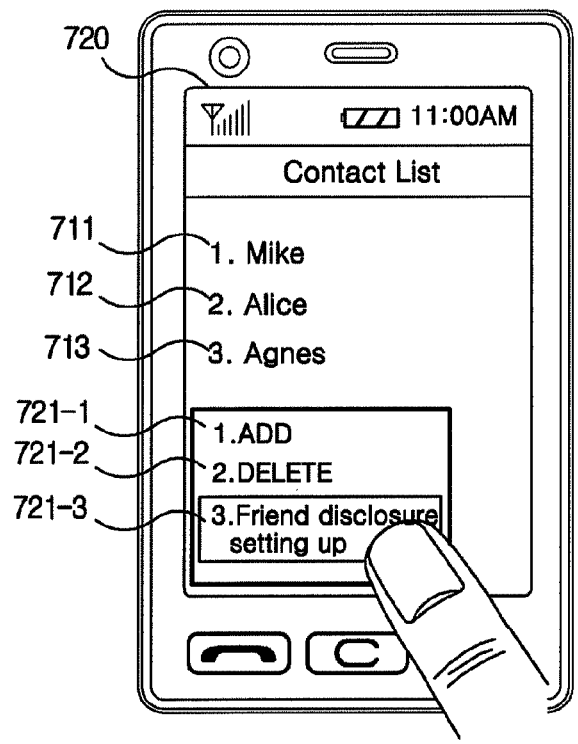

Then, as shown in FIG. 10b, the controller 180 displays a contact list 710 and a menu icon 714 on the display 151 of the user's mini home page or blog. As shown in the example in FIG. 10b, the contact list includes a plurality of contact items 711-713 and a menu icon 714. If the user selects the menu icon 714, the controller 180 displays a window including an add icon 721-1, a delete icon 721-2 and a friend privacy disclosure setting item 721-3.

Figure 10D:
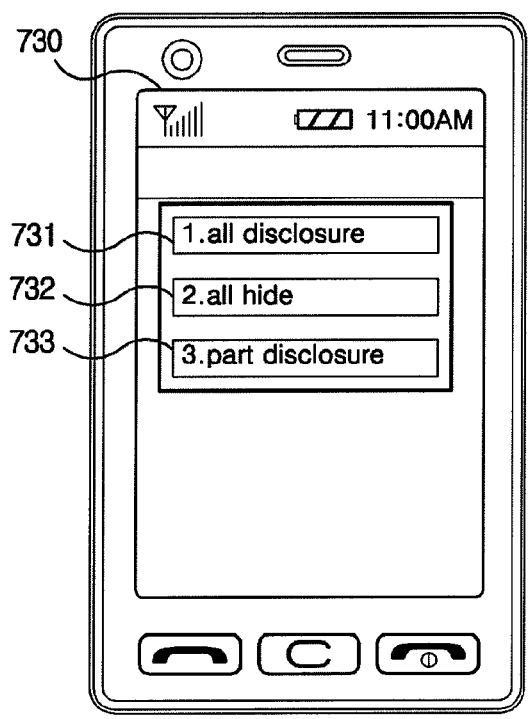

Then, as shown in FIG. 10d, if the user selects the friend privacy disclosure setting item 721-3, the controller 180 displays a privacy disclosure setting screen 730 on the display 151. As shown, the privacy disclosure setting screen 730 includes an all disclosure item 731, an all hide item 732 and a part disclosure item 733. The user can use the items 731, 732 and 733 to set the preferred privacy disclosure such that only the biographical item is to be disclosed by the user out of his or her contact list. Accordingly, the user can control or prevent all of his or her contact list's information from being disclosed.

Figure 11:
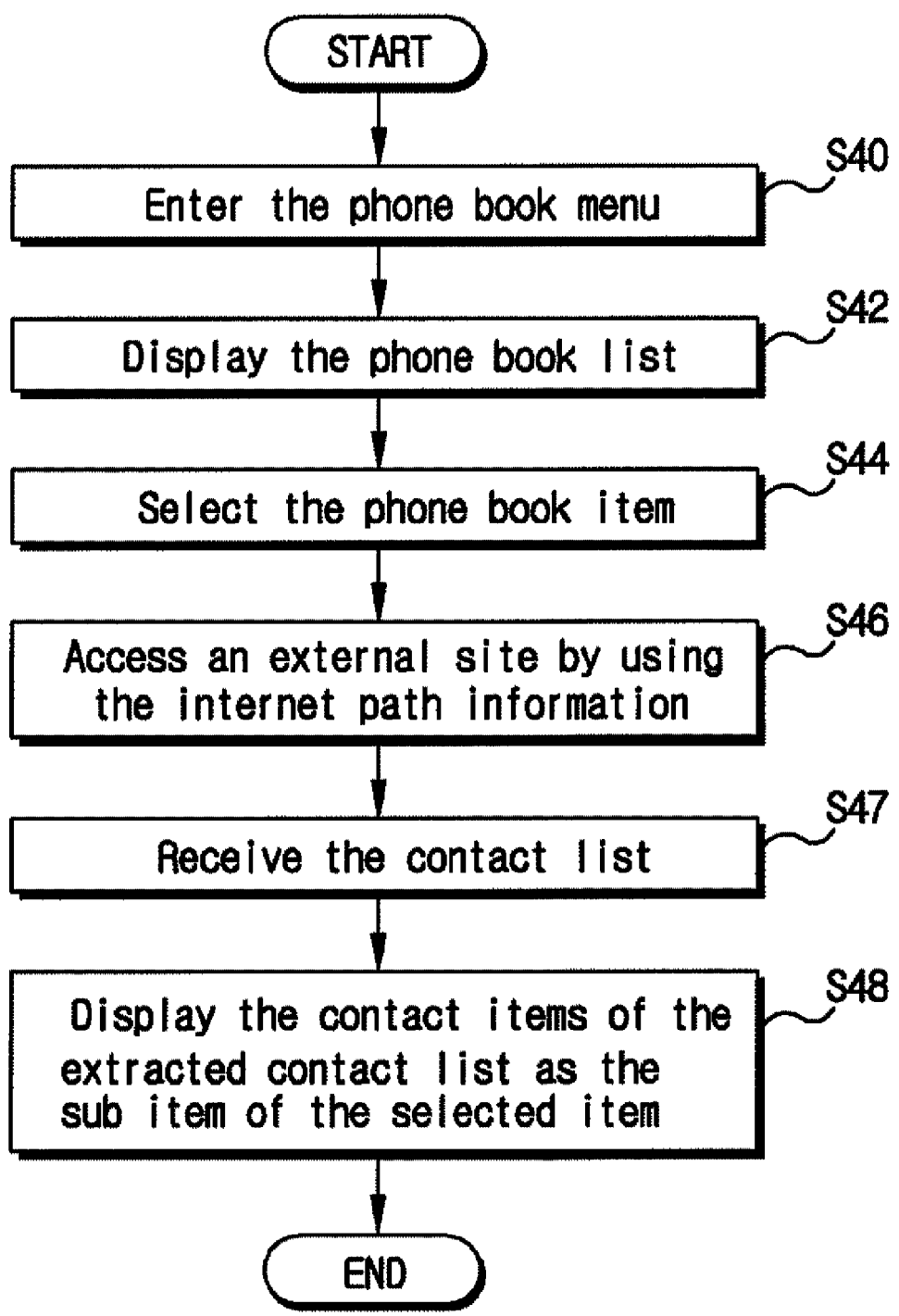
FIG. 11 is a flow chart illustrating a method of controlling a mobile terminal according to a third embodiment of the present invention.

Next, FIG. 11 is a flow chart illustrating a third embodiment of the present invention. As shown, the user enters a phone book menu using the user input unit 130 (S40), and the controller 180 displays a phone book list on the display unit (S42). The phone book list includes the user's phone book items, which as discussed previously, may include Internet path information. The user then selects a phone book item (S44), and the controller 180 drives the wireless communication module 110 to access an external site using the Internet path information (S46).

Then, the controller 180 receives a contact list stored in the external site through the wireless communication module 110(S47), and displays the contact items of the extracted contact list as sub items of the selected item (S48). Thus, according to the third embodiment, the user can easily select items.

Figure 12:
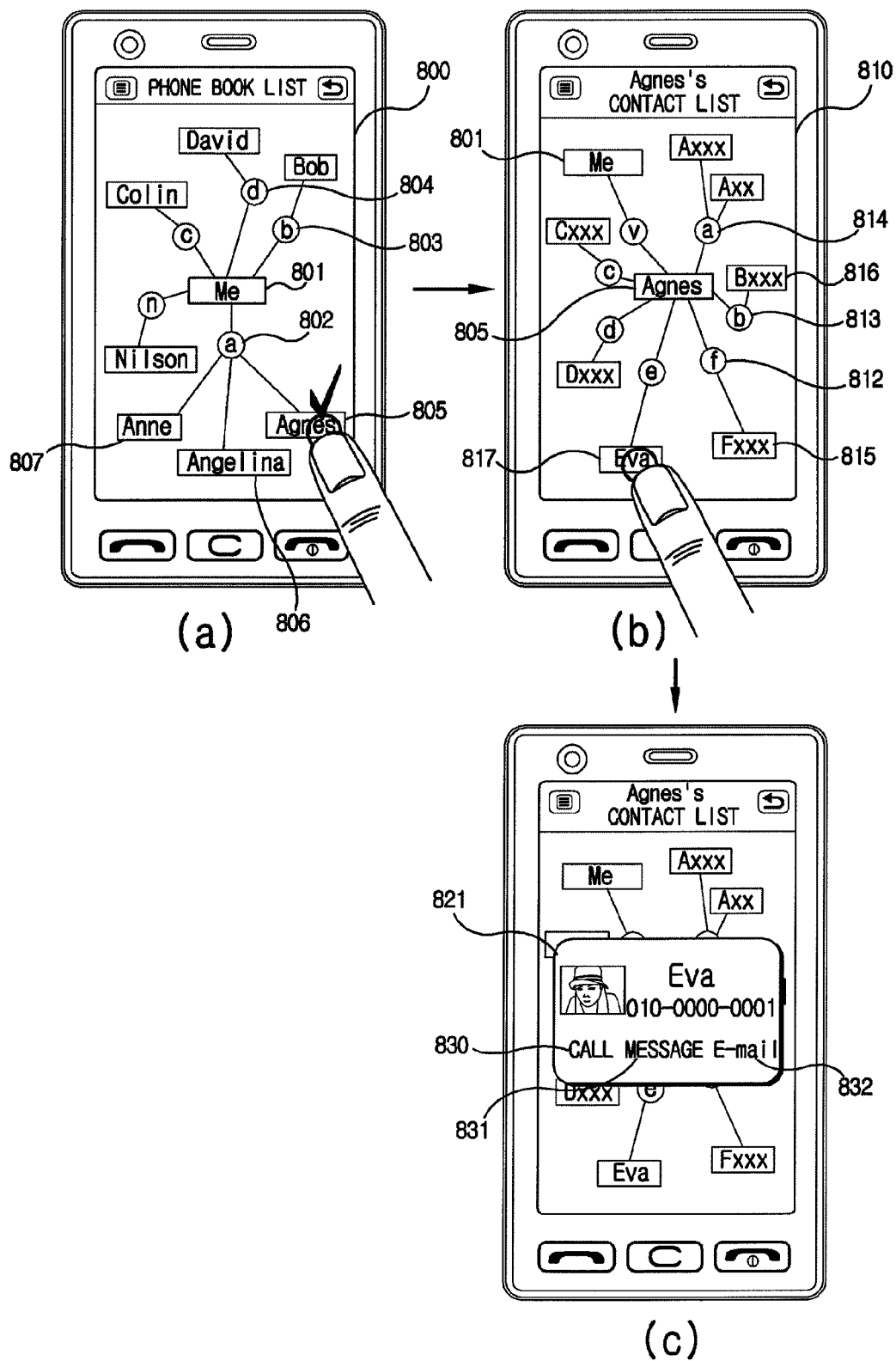
FIG. 12 includes overviews of display screens illustrating features of the third embodiment of the present invention.

FIG. 12 includes overviews of display screens illustrating a method of displaying contact items according to the third embodiment of the present invention. As shown in FIG. 12(a), the controller 180 displays a phone book list screen 800 on the display 151. In this example, the phone book list screen 800 includes a user item 801, classification items 802, 803, 804, and phone book items 805, 806 and 807.

The classification items 802, 803 and 804 are items for displaying classified items based on the specific criteria. Further, the classification items 802, 803 and 804 may be displayed per initial classification item and per group classification item. In addition, the controller 180 can radially display the classification items 802, 803 and 804 around the user item 801. The controller 180 can also connectively display the phone book items 805, 806 and 807 with the classification items 802, 803 and 804.

If the user selects the phone book item 805 for Agnes as shown in FIG. 12(a), the controller 180 uses the Internet path information included in the selected phone book item to access the external site. As shown in FIG. 12(b), the controller 180 extracts the contact list stored in the external site, and displays the contact list (i.e., 'Agnes' contact list in FIG. 12(b)) in a contact list screen 810 on display 151 based on the extracted contact list.

The controller 180 also radially displays the classification items 812, 813 and 814 around the selected phone book item 805. Moreover, the controller 180 connectively displays the contact items as sub items 815, 816 and 817 of the classification items 812, 813, 814. Further, the display of the classification items 802, 803 and 804 and the classified phone book items 806, 807 and 808 are not displayed.

In addition, as shown in FIG. 12(b), the user item 801 is connectively displayed with the selected phone book item 805. Thus, the user can select the phone book item 817 for Eva, and the controller 180 displays a contact icon window 821 on the display 151 as shown in FIG. 12(c). As shown in the example in FIG. 12c, the contact icon window 821 includes a call icon 830, a text message icon 831, an e-mail icon 832 and so on.

Further, the contact icon window 821 may include various other icons such as instant message icon for contacting a person corresponding to the selected item 817. Moreover, the contact icon window 821 may include the title information and the communication information of the selected item 817 as shown in FIG. 12(c). Alternatively, only the title information, and not the communication information, may be displayed on the contact icon window.

In addition, the functions in the contact window icon 821 are similar to the functions to the functions shown in the contact windows in the first implementation, and thus a detailed description on the contact window icon 821 will not be repeated. Also, when only the title information is displayed, the user can select the title information to transmit a call signal, a text message or an e-mail to the desired person. Accordingly, the privacy of the contacted person is maintained.

Alternatively, in another implementation, the controller 180 can not display the classification items 812, 813 and 814 on the contact list screen 810, and connectively display the sub items 815, 816 and 817 with the selected item 811. Accordingly, the user can select items of the phone book list and the contact list.

Figure 13:
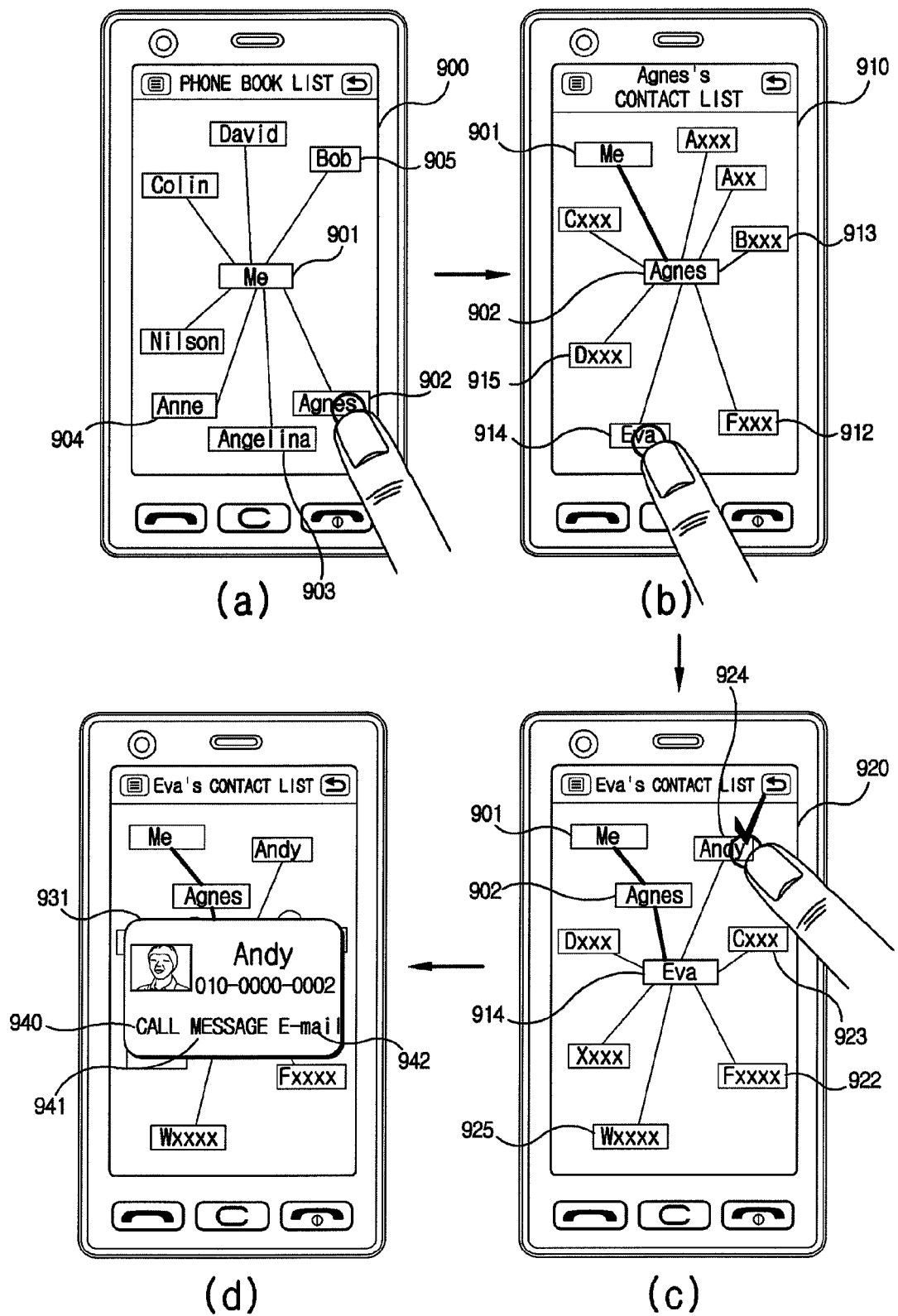
FIG. 13 includes overviews of display screens illustrating other features of the third embodiment of the present invention.

Next, FIG. 13 includes overviews of display screens illustrating another method of displaying contact items according to the third embodiment of the present invention. As shown in FIG. 13(a), the controller 180 displays a phone book list screen 900 on the display 151. As shown in the example in FIG. 13(a), the phone book list screen 900 includes a user item 901, and phone book items 902, 903, 904 and 905.

Further, the controller 180 radially displays the phone book items 902, 903, 904 and 905 around the user item 901. The user can then drag a line connecting the user item 901 and the first phone book item 902 to select the phone book item 902. The controller 180 then uses the Internet path information included in the selected phone book item 902 to access the first external site of the selected phone book item 902. Further, the controller 180 extracts the contact list stored in the external site and displays the extracted contact list as shown in FIG. 13(b). In this example, the selected contact list is for 'Agnes.'

In more detail, as shown in FIG. 13(b), the controller 180 displays an Agnes' contact list screen 910 on the display 151. The controller 180 also radially displays classification items 912, 913, 914 and 915 around the selected first phone book item 902 and does not display the other phone book items 903, 904 and 905. Moreover, in the example shown in FIG. 13(b), the controller 180 displays a thick line between the user item 901 and the selected phone book item 902 to distinctively display the selection path of the phone book item 902.

The controller 180 can also distinctively display the connection path using other ways. For example, the controller 180 can display the user item 901 and the selected phone book item 902 to be thicker or larger than other items. The user can then drag the line connecting the phone book item 902 and the first sub item 914 corresponding to Eva to select the first sub item 914 is selected. Other methods for selecting the first sub item (Eva) 914 are also available.

Next, the controller 180 uses the Internet path information included in the first sub item 914 to access the second external site, and extracts the contact list stored in the second external site. In the example shown in FIG. 13(b), the user requests Eva's contact list be extracted. Then as shown in FIG. 13(c), the controller 180 displays an Eva's contact list screen 920 on the display 151 based on the extracted contact list.

Further, the controller 180 radially displays sub items 922, 923, 924 and 925 of the extracted contact list around selected first sub item 914 and does not display the classified items 912, 913 and 915. The controller 180 also connectively displays the user item 901, the selected phone book item 902 and the selected first sub item 914 with a thick line to shown the selection path. The user can then select one item (Andy) 924 of the sub items 922, 923 and 924, 925.

As shown in FIG. 13(d), the controller 180 then displays a contact icon window 931 on the display 151 for contacting a person corresponding to the selected second sub item 924. As shown in the example in FIG. 13(d), the contact icon window 931 includes a call icon 940, a text message icon 9411, an e-mail icon 942 and so on. As discussed above with respect to FIG. 12, the contact icons may include the title information and the communication information of the second sub item 924 or may only include the title information.

Further, the functions in the contact window icon 931 are the same as the functions in FIG. 12 and thus a detailed description of the contact window icon 931 is omitted. Accordingly, the user can contact a person by selecting the item of the contact list stored in the external server. Moreover, the user can see easily see the highlighted path.

Figure 14:
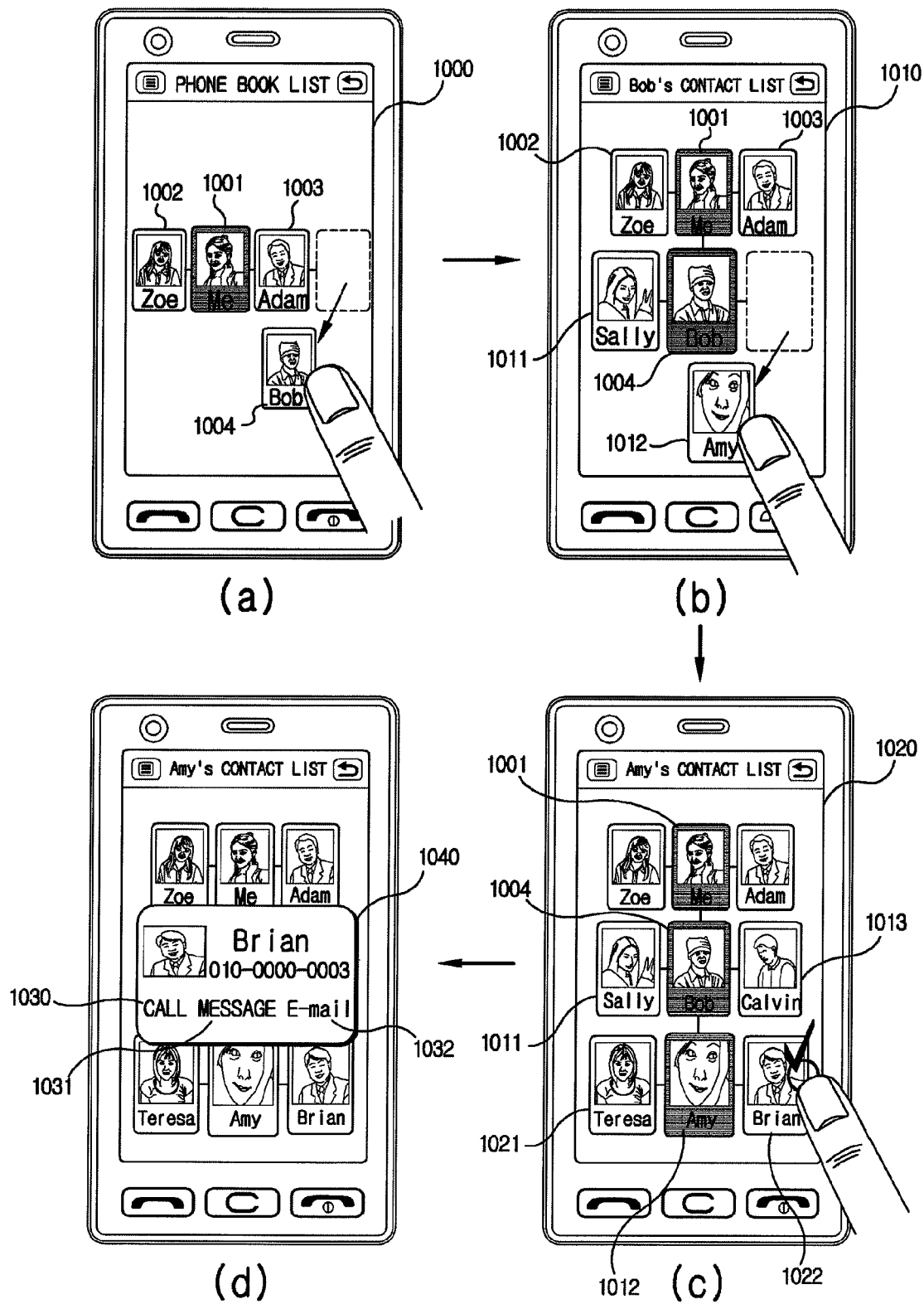
FIG. 14 includes overviews of display screens illustrating still other features of the third embodiment of the present invention.

Next, FIG. 14 includes overviews of display screens illustrating another method of displaying phone book information according to the third embodiment of the present invention. As shown in FIG. 14(a), the controller 180 displays a phone book list screen 1000 on the display 151. As shown in the example in FIG. 14(a), the phone book list screen 1000 includes a user item 1001 and items 1002, 1003, and 1004.

Further, the controller 180 displays the user item 1001 and the items 1002, 1003 and 1004 in sequence. In this example, the items 1002, 1003 and 1004 include an image and a text. Thus, if the user touches and drags the item 1004 as shown in FIG. 14(a), the controller 180 uses the Internet path information included in the selected item 1004 to access the external site of the selected item 1004. The controller 180 then extracts the contact list stored in the external site. In FIG. 14(a), the selected contact list 1004 is for 'Bob.'

As shown in FIG. 14(b), the controller 180 displays a Bob's contact list screen 1010 on the display unit 151 based on the extracted contact list. The controller 180 also radially displays sub items 1011 and 1012 of the extracted contact list around the selected phone book item 1004. In the example shown in FIG. 14(b), the controller 180 displays the selected phone book item 1004 and sub items 1011, 101 in a row at a predetermined distance from the phone book items 1001, 1002 and 1003.

Further, the size of the phone book items 1001, 1002 and 1003 may be displayed to be smaller than that of the sub items 1011, 1012. Alternatively, the user items 1001 and the selected phone book item 1004 can be displayed with a thick outline to show the selection path of the selected item 1004. Also, the thick outline is only one example, and other display methods are possible. For example, the user item 1001 and the selected phone book item 1004 can be displayed thicker or larger than the other items.

Then, as shown in FIG. 14(b), if the user touches and drags the first sub item 1012, the controller 180 access the external server corresponding to the first sub item 1012. In addition, the selected sub item 1012 has tag information including an address of the external server. The controller 180 then extracts the contact list of the selected first sub item 1012 from the server. In the example in FIG. 14(b), the sub item 1012 corresponds to Amy's contact list.

As shown in FIG. 14(c), the controller 180 then displays an Amy's contact list screen 1020 on the display 151 based on the extracted contact list. The controller 180 also sequentially displays the selected sub items 1012 and sub items 1021 and 1022 in a row at a predetermined spacing from the items 1004 and 1011. Further, the items 1001, 1004 and 1012 may be displayed to be smaller or larger than the other sub items. In FIG. 14c, the item 1001 is displayed to be smaller than the item 1004, and the item 1004 is displayed to be smaller than the item 1012, giving the user a feel for the connection path between the items.

Further, in the example in FIG. 14(c), the controller 180 can also connectively display the user item 1001, the selected item 1004 and the selected first sub item 1012 using a thick line, for example. The user can then select the second sub item 1022, which in this example corresponds to the name 'Brian.' The controller 180 then displays a contact icon window 1040 on the display 151 for contacting Brian as shown in FIG. 14(d). Similar to the above description, the contact icon window 1040 includes a call icon 1031, a text message icon 1032, an e-mail icon 1033 and so on.

The contact icon window 1040 may also include the title information and the communication information of the second sub item 1022, or may only include the title information. Further, the functions of the contact window icon 1040 have already been discussed above, and thus will not be repeated. Accordingly, because the user can see the items with a three dimensional feel, the user can easily select items. Moreover, the user can easily see the connections path.

Figure 15:
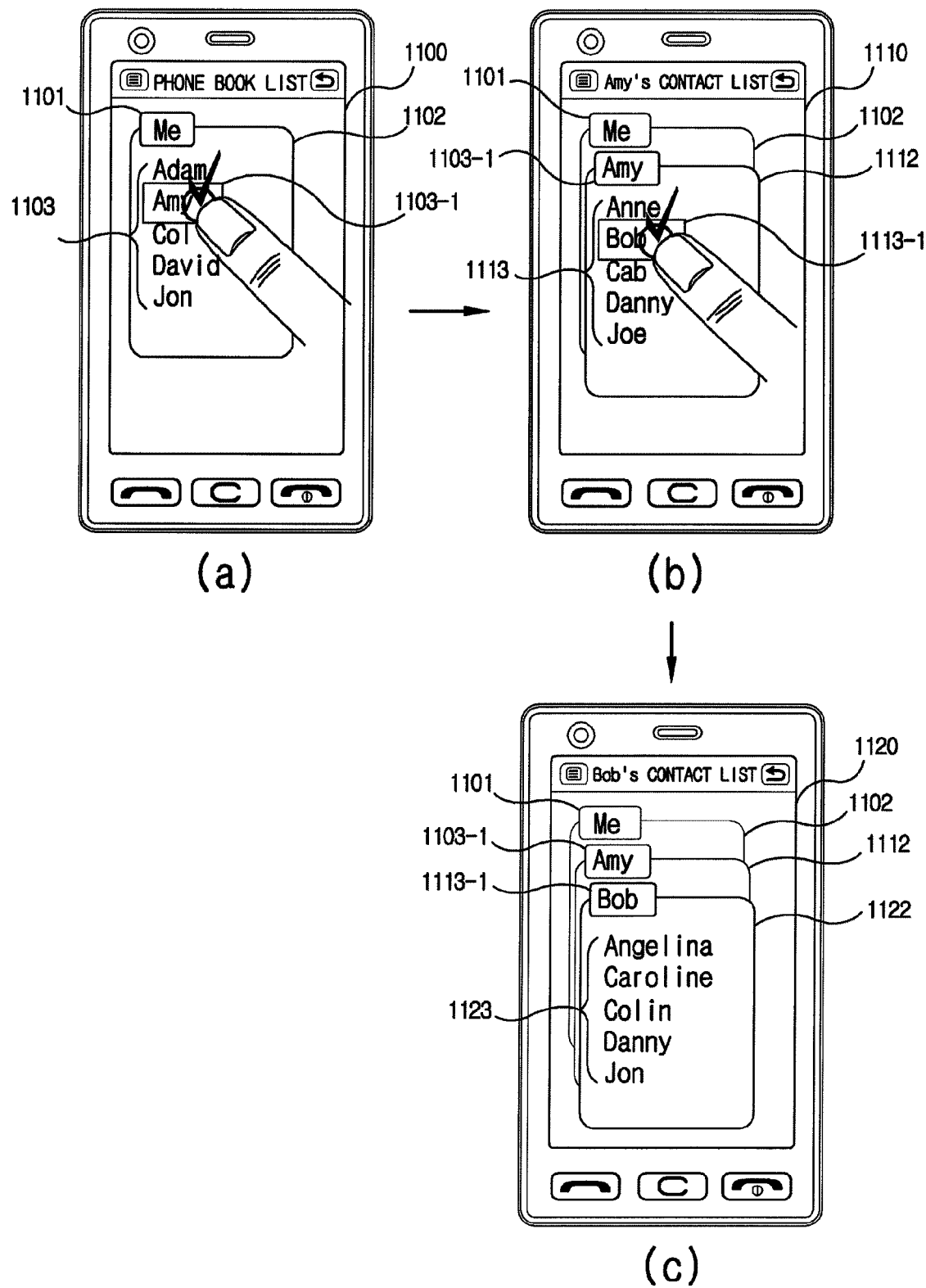
FIG. 15 includes overviews of display screens illustrating other features of the third embodiment of the present invention.

Next, FIG. 15 includes overviews of display screens illustrating yet another method of displaying phone book information according to the third embodiment of the present invention. As shown in FIG. 15(a), the controller 180 displays a phone book list screen 1100 on the display 151. In the example in FIG. 15(a), the displayed phone book list screen 1100 includes a user item 1101 and a first window 1102.

Further, the first window 1102 includes a plurality of items 1103. If the user selects one of the plurality of the items 1103, the controller 180 accesses the external site using the Internet path information included in the selected item 1103. The controller 180 also extracts the contact list stored in the external site. In this example, the contact list is for 'Amy.'

As shown in FIG. 15(b), the controller 180 also displays an Amy's contact list screen 1110 on the display 151 based on the extracted contact list. Further, the controller 180 displays the selected item 1103-1 on the upper part of the first window 1102, and displays a second window 1112 including the first item 1113 of the extracted contact item under the first item 1103-1.

If the user selects the second item 1113-1, the controller 180 uses the Internet path information included in the selected second item 1113-1 to access the external site. The controller 180 then extracts the contact list of the selected second item 1113-1 from the external site. In this example, the contact list is for 'Bob.' As shown in FIG. 15(c), the controller 180 then displays a Bob's contact list screen 1120 on the display unit 151 based on the extracted contact list.

As shown in this example, the controller 180 displays the selected second item 1113-1 in an upper part of the second window 1112 and displays a third window 1122 including the second item 1123 of the extracted contact list under the selected second item 1113-1. Next, if the user selects one of the second items 1123, the controller 180 displays another contact icon window on the display unit 151, so that the user can contact the person corresponding to the selected item. Accordingly, the user can easily identify the items, and understand the selection path of the item that the user has selected.

Figure 16:
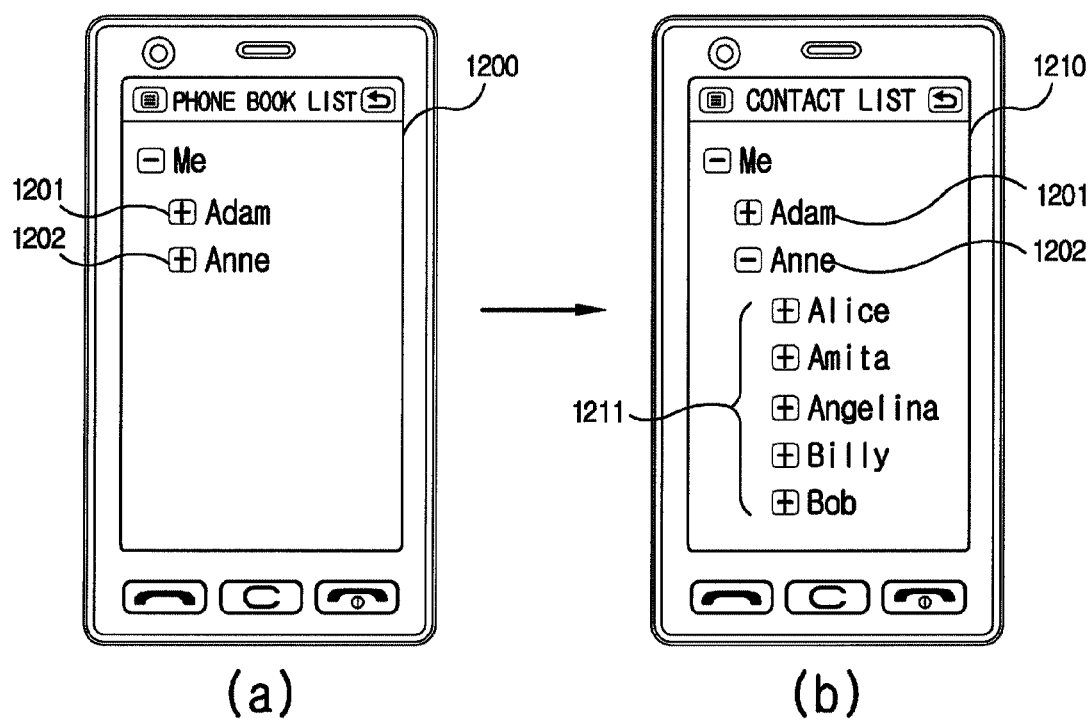
FIG. 16 includes overviews of display screens illustrating still other features of the third embodiment of the present invention.

Next, FIG. 16 includes overviews of display screens illustrating another method of displaying a contact list according to the third embodiment of the present invention. As shown in FIG. 16(a), the controller 180 displays a phone book list screen 1200 on the display 151. As shown in this example, the phone book list screen includes items 1201 and 1202 which are displayed as a tree diagram. If the user selects the item 1202, the controller 180 uses the Internet path information included in the selected item 1202 to access the external site.

The controller 180 then extracts the contact list stored in the external site, which in this example is Anne's contact list. As shown in FIG. 16(b), the controller 180 displays an Anne's contact list screen 1210 on the display 151 based on the extracted contact list. Further, in this example, Anne's contact list screen 1210 includes a phone book list as well as Anne's contact list.

In addition, the controller 180 displays the contact list as a sub item of the selected item. The user can then select one of the sub items 1211. For example, the user can select an item by double-clicking the item. The controller 180 then displays a contact icon window on the display 151 for contacting the person corresponding to the selected item. Accordingly, the user can easily identify the items, and understand the selection path of the item that the user has selected.

The above-described methods can be implemented in a program recorded medium as computer-readable codes. The computer-readable media may include all kinds of recording devices in which data readable by a computer system is stored. The computer-readable media may include, for example, ROM, RAM, CD-ROM, magnetic tapes, floppy discs, optical data storage devices, and the like, and also include Internet transmissions. In addition, the above embodiments may be modified and selectively combined.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal, the method comprising:
   displaying, via a display on the mobile terminal, a list of contacts included on the mobile terminal;
   selecting, via an input unit on the mobile terminal, a first contact included in the list of contacts;
   accessing, via a wireless communication unit, a web site corresponding to the first contact;
   displaying, on the display, a list of contacts of the first contact included on the web site corresponding to the first contact without displaying personal contact information for the list of contacts of the first contact;
   selecting, via the input unit, a second contact from the list of contacts of the first contact;

displaying, via the display, a plurality of options for communicating with the second contact without displaying personal contact information of the second contact that is used for communicating with the second contact;
selecting, via the input unit, one of the plurality of options for communicating with the second contact; and
communicating, via the wireless communication unit, with the second contact via the selected communication option without displaying the personal contact information that is used for communicating with the second contact.

2. The method of claim 1, wherein the plurality of options for communicating with the second contact include emailing the second contact, calling the second contact, messaging the second contact, and accessing a list of contacts of the second contact.

3. The method of claim 2, wherein the personal contact information that is used for communicating with the second contact and that is not displayed includes an email address when emailing the second contact, a phone number when calling the second contact, a messaging address when messaging the second contact, and a web address of a web site corresponding to the second contact when accessing the list of contacts of the second contact.

4. The method of claim 2, further comprising:
selecting, via the input unit, the option for accessing the list of contacts of the second contact;
accessing, via the wireless communication unit, the list of contacts of the second contact;
displaying, on the display, the list of contacts of the second contact without displaying personal contact information for the list of contacts of the second contact;
selecting, via the input unit, a third contact from the list of contacts of the second contact;
displaying, via the display, a plurality of options for communicating with the third contact without displaying detailed contact information that is used for communicating with the third contact;
selecting, via the input unit, one of the plurality of options for communicating with the third contact; and
communicating, via the wireless communication unit, with the third contact via the selected communication option without displaying the personal contact information that is used for communicating with the third contact.

5. The method of claim 1, further comprising:
displaying, via the display, an option for storing the second contact in a memory of the mobile terminal; and
storing the second contact in the memory of the mobile terminal.

6. The method of claim 1, wherein displaying the list of contacts of the first contact includes displaying only titles or names identifying the contacts included in the list of contacts.

7. The method of claim 1, wherein the displayed first and second contacts include tag information indicating an address of web pages corresponding to the first and second contacts.

8. The method of claim 1, further comprising:
radially displaying the list of contacts on the mobile terminal around a user name of the mobile terminal; and
radially displaying the list of contacts of the first contact around the first contact.

9. The method of claim 1, wherein the list of contacts on the mobile terminal and the list of contacts of the first contact are displayed as thumbnail images.

10. The method of claim 1, further comprising:
setting a privacy disclosure range for the list of contacts on the mobile indicating whether or not other contacts can contact the list of contacts on the mobile terminal.

11. A mobile terminal, comprising:
a display configured to display a list of contacts included on the mobile terminal;
an input unit configured to receive a selection signal indication a selection of a first contact included in the list of contacts; and
a wireless communication unit configured to access a web site corresponding to the first contact,
wherein the display is further configured to display a list of contacts of the first contact included on the web site corresponding to the first contact without displaying personal contact information for the list of contacts of the first contact,
wherein the input unit is further configured to receive a selection signal indicating a selection of a second contact from the list of contacts of the first contact,
wherein the display is further configured to display a plurality of options for communicating with the second contact without displaying personal contact information of the second contact that is used for communicating with the second contact,
wherein the input unit is further configured to receive a selection signal indicating a selection of one of the plurality of options for communicating with the second contact, and
wherein the wireless communication unit is further configured to communicate with the second contact via the selected communication option without displaying the personal contact information that is used for communicating with the second contact.

12. The mobile terminal of claim 11, wherein the plurality of options for communicating with the second contact include emailing the second contact, calling the second contact, messaging the second contact, and accessing a list of contacts of the second contact.

13. The mobile terminal of claim 12, wherein the personal contact information that is used for communicating with the second contact and that is not displayed includes an email address when emailing the second contact, a phone number when calling the second contact, a messaging address when messaging the second contact, and a web address of a web site corresponding to the second contact when accessing the list of contacts of the second contact.

14. The mobile terminal of claim 12, wherein the input unit is further configured to receive a selection signal indicating a selection of the option for accessing the list of contacts of the second contact,
wherein the wireless communication unit is further configured to access the list of contacts of the second contact,
wherein the display is further configured to display the list of contacts of the second contact without displaying personal contact information for the list of contacts of the second contact,
wherein the input unit is further configured to receive a selection signal indicating a selection of a third contact from the list of contacts of the second contact,
wherein the display is further configured to display a plurality of options for communicating with the third contact without displaying detailed contact information that is used for communicating with the third contact,
wherein the input unit is further configured to receive a selection signal indicating a selection of one of the plurality of options for communicating with the third contact, and
wherein the wireless communication unit is further configured to communicate with the third contact via the selected communication option without displaying the personal contact information that is used for communicating with the third contact.

15. The mobile terminal of claim 11, wherein the display is further configured to display an option for storing the second contact in a memory of the mobile terminal, and wherein the method further comprises storing the second contact in the memory of the mobile terminal.

16. The mobile terminal of claim 11, wherein the display unit is further configured to display only titles or names identifying the contacts included in the displayed list of contacts.

17. The mobile terminal of claim 11, wherein the displayed first and second contacts include tag information indicating an address of web pages corresponding to the first and second contacts.

18. The mobile terminal of claim 11, wherein the display is further configured to radially display the list of contacts on the mobile terminal around a user name of the mobile terminal, and to radially display the list of contacts of the first contact around the first contact.

19. The mobile terminal of claim 11, wherein the list of contacts on the mobile terminal and the list of contacts of the first contact are displayed as thumbnail images.

20. The mobile terminal of claim 11, wherein the input unit is further configured to set a privacy disclosure range for the list of contacts on the mobile indicating whether or not other contacts can contact the list of contacts on the mobile terminal.

* * * * *